United States Patent
Iseda et al.

(10) Patent No.: US 11,041,076 B2
(45) Date of Patent: Jun. 22, 2021

(54) HIGHLY DURABLE ANTIFOGGING COATING FILM AND COATING COMPOSITION

(71) Applicant: ASAHI KASEI KABUSHIKI KAISHA, Tokyo (JP)

(72) Inventors: Kazuya Iseda, Tokyo (JP); Hiroaki Takanohashi, Tokyo (JP); Junichi Hirose, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 336 days.

(21) Appl. No.: 16/079,497

(22) PCT Filed: Mar. 10, 2017

(86) PCT No.: PCT/JP2017/009725
§ 371 (c)(1),
(2) Date: Aug. 23, 2018

(87) PCT Pub. No.: WO2017/159564
PCT Pub. Date: Sep. 21, 2017

(65) Prior Publication Data
US 2019/0055410 A1     Feb. 21, 2019

(30) Foreign Application Priority Data

Mar. 14, 2016  (JP) .............................. JP2016-049951
Nov. 14, 2016  (JP) .............................. JP2016-221442

(51) Int. Cl.
| | | |
|---|---|---|
| C09D 5/00 | (2006.01) | |
| C09D 5/02 | (2006.01) | |
| C09D 5/16 | (2006.01) | |
| C09D 201/00 | (2006.01) | |
| C09D 7/40 | (2018.01) | |
| C09D 133/26 | (2006.01) | |
| C09D 171/02 | (2006.01) | |

(52) U.S. Cl.
CPC ............... *C09D 5/00* (2013.01); *C09D 5/02* (2013.01); *C09D 5/16* (2013.01); *C09D 7/40* (2018.01); *C09D 133/26* (2013.01); *C09D 171/02* (2013.01); *C09D 201/00* (2013.01)

(58) Field of Classification Search
CPC ... C09D 5/00; C09D 5/02; C09D 5/16; C09D 171/02; B32B 2264/1921; B32B 2307/712; B32B 2307/728; Y10T 428/2996; Y10T 428/31609
See application file for complete search history.

(56) References Cited

U.S. PATENT DOCUMENTS

| | | | |
|---|---|---|---|
| 2003/0203991 A1 | 10/2003 | Schottman et al. | |
| 2006/0047064 A1* | 3/2006 | Murata | C03C 17/322 524/589 |
| 2007/0077399 A1* | 4/2007 | Borowiec | C08G 18/10 428/195.1 |
| 2007/0129478 A1 | 6/2007 | Nakamura et al. | |
| 2008/0160289 A1 | 7/2008 | Lin | |
| 2012/0285528 A1* | 11/2012 | Takanohashi | C09D 5/18 136/256 |
| 2016/0130463 A1 | 5/2016 | Sugihara et al. | |
| 2018/0065147 A1 | 3/2018 | Iseda et al. | |

FOREIGN PATENT DOCUMENTS

| | | |
|---|---|---|
| CN | 101809101 A | 8/2010 |
| CN | 102341467 A | 2/2012 |
| JP | 58-193185 A | 11/1983 |
| JP | 2010-70607 A | 4/2010 |
| JP | 2011-189273 A | 9/2011 |
| JP | 2011-192397 A | 9/2011 |
| JP | 4812902 B1 | 11/2011 |
| JP | 2014-148042 A | 8/2014 |
| JP | 2016-16663 A | 2/2016 |

(Continued)

OTHER PUBLICATIONS

Chinese Office Action, dated Nov. 15, 2019 for Chinese Application No. 201780011309.2, with an English machine translation.

(Continued)

*Primary Examiner* — Joanna Pleszczynska
(74) *Attorney, Agent, or Firm* — Birch, Stewart, Kolasch & Birch, LLP

(57) ABSTRACT

The present invention pertains to a coating film, and more particularly, to an antifogging coating film having excellent antifogging properties, ability to retain antifogging properties, and water resistance. The coating film according to the present invention contains a metal oxide (A) and a hydrophilic compound (B), wherein the elemental concentration ratio (C1s/M), which is between the element C and a metal element and which is obtained from a metal (M) spectrum derived from the metal oxide and a C1s spectrum in an elemental analysis of the surface using XPS, is within the range of 0.2-10. The relative elemental concentration of the element C obtained from a C1s spectrum derived from carbon-oxygen bonds and/or carbon-nitrogen bonds in elemental analysis of the surface using XPS may be within the range of 5-50 atomic %. The metal oxide may be colloidal silica. The coating film according to the present invention can be particularly preferably used as an antifogging coating film and a coating film for automotive exterior parts.

17 Claims, No Drawings

(56) References Cited

FOREIGN PATENT DOCUMENTS

| | | |
|---|---|---|
| JP | 2017-61598 A | 3/2017 |
| JP | 2017-115044 A | 6/2017 |
| KR | 10-2010-0067647 A | 6/2010 |
| KR | 10-2011-0091559 A | 8/2011 |
| WO | WO 01/34714 A1 | 5/2001 |
| WO | WO 2005/075583 A1 | 8/2005 |
| WO | WO 2007/146353 A2 | 12/2007 |
| WO | WO 2009/044912 A1 | 4/2009 |
| WO | WO 2010/104146 A1 | 9/2010 |
| WO | WO 2012/161330 A1 | 11/2012 |
| WO | WO 2015/008672 A1 | 1/2015 |

OTHER PUBLICATIONS

Korean Office Action, dated Nov. 19, 2019, for Korean Application No. 10-2018-7020747, with an English translation.
Japanese Office Action, dated Jul. 2, 2019, for Japanese Application No. 2018-505896, with an English translation.
Chinese Office Action for Chinese Application No. 201780011309.2, dated Jul. 7, 2020, with English translation.
Japanese Office Action, dated Feb. 5, 2020, for Japanese Application No. 2018-505896, with an English translation.
International Search Report, issued in PCT/JP2017/009725, PCT/ISA/210, dated May 9, 2017.
Written Opinion of the International Searching Authority, issued in PCT/JP2017/009725, PCT/ISA/237, dated May 9, 2017.
Korean Office Action for Korean Application No. 10-2018-7020747, dated Apr. 29, 2020, with an English translation.
European Office Action, dated Mar. 5, 2019, for European Application No. 17766564.3.
European Search Report, dated Feb. 4, 2019, for European Application No. 17766564.3.
Japanes Office Action, dated Sep. 2, 2020, for Japanese Application No. 2018-505896, with an English translation.

* cited by examiner

HIGHLY DURABLE ANTIFOGGING COATING FILM AND COATING COMPOSITION

TECHNICAL FIELD

The present invention relates to an antifogging coating film and a coating composition. The present invention relates to a coating composition for forming an antifogging coating film having excellent antifogging properties, ability to retain antifogging properties, and water resistance and such an antifogging coating film.

BACKGROUND ART

Resin molded bodies have been widely used as substitutes for glass plates from viewpoints of weight reduction and moldability. As an application thereof, the resin molded body is used in a wide range of fields such as auto parts, home electric appliance parts, housings, containers, films and sheets. Especially transparent plastics are used in, for example, windows, optical lenses, mirrors, spectacles, goggles, sound insulation walls, lenses for traffic lamps, lenses for head lamps, curve mirrors, windshields and face plates. However, in a resin substrate such as plastics, when the temperature of one surface of the substrate is equal to or lower than the dew point temperature due to a difference in temperature and humidity with the outside air, or when a sudden temperature and humidity change occurs, dew condenses on the substrate surface, and fine water droplets adhere to the surface, so that transmitted light may be scattered in some cases. In such a case, the transparency of the resin molded body is impaired, and so-called fogging occurs.

As a method for preventing the fogging, the following proposals have been made.

(1) A method of preparing a coating film of a water-absorbing compound on the surface of a substrate.

(2) A method of making the surface of a substrate hydrophilic by preparing a coating film of a hydrophilic compound such as a surfactant on the surface of the substrate.

Specifically, as the method (1), Patent literature 1 proposes, for example, an antifogging article which has a water-absorptive crosslinked resin layer formed of a cured epoxide resin or a urethane resin and in which the water-absorptive layer contains metal oxide fine particles. On the other hand, Patent Literature 2 proposes an antifogging article including a water-absorbing layer containing a cured epoxy resin and a polyoxyethylene alkyl ether surfactant.

However, in these methods, although antifogging properties can be maintained up to a certain level, when moisture more than the water-absorbing capacity aggregates and adheres to the article, fogging occurs. Thus, there is a disadvantage that it is necessary to increase the film thickness in order to develop high ability to retain antifogging properties.

As the method (2), Patent Literatures 3 and 4 disclose a hydrophilic and antifouling coating film characterized in that colloidal silica is present at the surface of the coating film. Specifically, Patent Literatures 3 and 4 disclose an antifouling coating film containing colloidal silica and a nonionic surfactant. However, this example is characterized in that colloidal silica is unevenly distributed on the outermost surface of the coating film. Thus, although the initial hydrophilicity and the antifogging properties are excellent, under harsh environments such as high temperature and high humidity environment, the antifogging properties may deteriorate due to, for example, adsorption of foreign matters onto the coating film surface.

CITATION LIST

Patent Literature

PATENT LITERATURE 1: WO 2012/161330
PATENT LITERATURE 2: WO 2015/008672
PATENT LITERATURE 3: JP-B-4812902
PATENT LITERATURE 4: WO 2010/104146

SUMMARY OF INVENTION

Technical Problem

It is an object of the present invention to provide a novel coating film not existing in the prior art. In view of the above-mentioned problems of the prior art, it is a further object of the present invention to provide an antifogging coating film which preferably has excellent antifogging properties and water resistance and can retain the antifogging properties even when exposed to a harsh environment such as high temperature and high humidity.

Solution to Problem

As a result of intensive studies to solve the above problems, the present inventors have completed the present invention.

That is, aspects of the present invention are as follows:

[1].
A coating film comprising a metal oxide (A) and a hydrophilic compound (B), wherein an elemental concentration ratio (C1s/M), which is between carbon (C) element and a metal element and which is obtained from a metal (M) spectrum derived from the metal oxide and a C1s spectrum in an elemental analysis of the surface using XPS, is within the range of 0.2 to 10.

[2].
The coating film according to [1], wherein a relative elemental concentration of the carbon (C) element obtained from the C1s spectrum derived from carbon-oxygen bonds and/or carbon-nitrogen bonds in the elemental analysis of the surface using XPS is within the range of 5 to 50 atomic %.

[3].
The coating film according to [1] or [2], wherein the metal oxide (A) is colloidal silica.

[4].
The coating film according to any one of [1] to [3], wherein the hydrophilic compound (B) is bonded to the surface of the metal oxide via a non-covalent bond and/or a covalent bond.

[5].
The coating film according to any one of [1] to [4], further comprising an isocyanate compound (C).

[6].
The coating film according to any one of [1] to [5], wherein the hydrophilic compound (B) is at least one selected from the group consisting of a nonionic compound, an anionic compound, and a zwitterionic compound.

[7].
The coating film according to any one of [1] to [6], wherein the hydrophilic compound (B) has a carbon-oxygen bond in the molecule.

[8].

The coating film according to any one of [1] to [7], wherein the hydrophilic compound (B) has an alkylene glycol moiety in the molecule.

[9].

The coating film according to any one of [1] to [8], wherein the isocyanate compound (C) is a water-dispersible polyisocyanate compound.

[10].

The coating film according to any one of [1] to [9], wherein the isocyanate compound (C) is a blocked polyisocyanate.

[11].

The coating film according to any one of [1] to [10], further comprising polymer particles (D).

[12].

The coating film according to any one of [1] to [11], wherein when the coating film is exposed to an environment of 85° C. and 85% RH for 24 hours and then subjected to a moisture resistance test in which the coating film is allowed to stand in an environment of 23° C. and 50% RH for 1 hour, the coating film has a water contact angle of less than 40° determined.

[13].

A coating composition for producing the coating film according to any one of [1] to [12], the coating composition comprising a metal oxide (A) and a hydrophilic compound (B) and optionally comprising an isocyanate compound (C) and/or polymer particles (D) and/or water.

[14].

The coating composition according to [13], wherein the hydrophilic compound (B) has two or more functional groups capable of reacting with an isocyanate group in the molecule.

[15].

The coating composition according to [13] or [14], wherein an HLB value of the hydrophilic compound (B) determined by a Griffin method is 2 to 14.

[16].

A laminate comprising a resin substrate and/or a glass substrate and the coating film according to any one of [1] to [12].

[17].

Use of the coating film according to any one of [1] to [12] for imparting antifogging properties to a resin substrate and/or a glass substrate.

[18].

The coating film according to any one of [1] to [12], which is used as an antifogging coating film.

[19].

The coating film according to any one of [1] to [12], which is used as a coating film for automotive exterior parts.

In additional embodiments, the coating film of the present invention having a specific application may be expressed as follows:

[1A]

An antifogging coating film comprising a metal oxide (A) and a hydrophilic compound (B), wherein an elemental concentration ratio (C1s/M), which is between carbon (C) element and a metal element and which is obtained from a metal (M) spectrum derived from the metal oxide and a C1s spectrum in an elemental analysis of the surface using XPS, is within the range of 0.2 to 10.

[1B]

A coating film for automotive exterior parts comprising a metal oxide (A) and a hydrophilic compound (B), wherein an elemental concentration ratio (C1s/M), which is between carbon (C) element and a metal element and which is obtained from a metal (M) spectrum derived from the metal oxide and a C1s spectrum in an elemental analysis of the surface using XPS, is within the range of 0.2 to 10.

Advantageous Effects of Invention

According to the present invention, a novel coating film not existing in the prior art is provided. Further, according to the present invention, it is possible to provide a coating film which preferably has excellent antifogging properties and waterproofness and retains the antifogging properties even when exposed to a harsh environment such as high temperature and high humidity.

DESCRIPTION OF EMBODIMENTS

Hereinafter, a mode for carrying out the present invention (hereinafter abbreviated as "embodiment") will be described in detail. The present invention is not limited to the following embodiments, and various modifications may be made within the gist of the present invention.

Each of components for the present invention will be described below.

The coating film according to an embodiment is, for example, formed by applying a coating composition (sometimes abbreviated as "aqueous dispersion"), dispersed in a solvent such as water or the like, onto a substrate and drying the coating composition. Accordingly, the coating film and the coating composition basically have the same components and the same proportions thereof except for the solvent. That is, the coating film according to the present invention has the characteristics and the amount ratio possessed by components of the coating composition described below, unless otherwise specified. Accordingly, the features of the coating composition will be mainly described below.

The coating composition according to an embodiment comprises component (A): a metal oxide and component (B): a hydrophilic compound.

These components will be described in detail.

Component (A): Metal Oxide

From a viewpoint of interaction with component (B), examples of the metal oxide usable for component (A) include silicon dioxide, aluminum oxide, antimony oxide, titanium oxide, indium oxide, tin oxide, zirconium oxide, lead oxide, iron oxide, calcium silicate, magnesium oxide, niobium oxide, cerium oxide, or the like. Preferable among these are silicon dioxide (silica) abundant in surface hydroxyl groups, aluminum oxide (alumina), antimony oxide and composite oxides thereof from a viewpoint of the strength of the interaction. As component (A), two or more of the above-mentioned metal oxides may be used in combination.

Further, as the metal oxide used for component (A), a compound (hereinafter, sometimes simply referred to as the "photocatalyst") exhibiting photocatalyst activity and/or hydrophilicity by light irradiation may be used from a viewpoint of imparting resistance to stain or fouling. When the compound exhibiting photocatalyst activity by light irradiation is used as component (A), the surface of a coating film formed from the coating composition is excellent in activity of decomposing a contaminant organic substance and resistance to stain or fouling. Herein, "hydrophilicity" of a coating film means that a contact angle of water (23° C.) with respect to the surface of an object to be measured is preferably 60° or less, more preferably 30° or less and further preferably 20° or less. A method of measuring the water contact angle will be described later in Examples. The "compound exhibiting hydrophilicity by light irradiation" as used herein is distinguished from the hydrophilic compound of component (B) which originally has hydrophilicity.

More specifically, $TiO_2$, $ZnO$, $SrTiO_3$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $RuO_2$, $CeO_2$, or the like can be used as the photocatalyst. Further, layered oxides having at least one element selected from Ti, Nb, Ta, and V can be used as the photocatalyst (see, for example, JP-S62-74452A, JP-H2-172535A, JP-H7-24329A, JP-H8-89799A, JP-H8-89800A, JP-H8-89804A, JP-H8-198061A, JP-H9-248465A, JP-H10-99694A, and JP-H10-244165A). Of these photocatalysts, $TiO_2$ (titanium oxide) is preferable since it is nontoxic and excellent in chemical stability. The titanium oxide with any of an anatase structure, a rutile structure and a brookite structure can be used.

As the metal oxide used for component (A), a conductive metal oxide can be used from a viewpoint of exhibiting antistatic properties (or the like) of the coating film formed from the coating composition. As the conductive metal oxide, indium oxide doped with tin (ITO), tin oxide doped with antimony (ATO), tin oxide, zinc oxide, or the like can be used, for example.

Component (A) is used as a raw material of the coating composition in the form of, for example, powder, a dispersion, a sol, or the like. Here, the form of the dispersion or the sol refers to the state where component (A) is dispersed in water and/or a hydrophilic organic solvent in the form of primary particles and/or secondary particles with a concentration of 0.01 to 80% by mass and preferably 0.1 to 50% by mass. Examples of the hydrophilic organic solvent usable include alcohols such as ethylene glycol, butyl cellosolve, n-propanol, isopropanol, n-butanol, ethanol, and methanol; ketones such as acetone, methyl ethyl ketone, and methyl isobutyl ketone; ethers such as tetrahydrofuran and dioxane; amides such as dimethylacetamide and dimethylformamide; dimethyl sulfoxide; nitrobenzene; N-methylpyrrolidone; and a mixture of two or more thereof.

The number average particle size of component (A) observed in the powder, the dispersion, or the sol (that may be a mixture of primary particles and secondary particles or either one of primary particles and secondary particles), is preferably 1 nm to 400 nm, more preferably 1 nm to 100 nm, still more preferably 3 nm to 80 nm and particularly preferably 4 nm to 50 nm. Herein, the number average particle size in a specific range is usually maintained even in a formed coating film. The number average particle size of component (A) can contribute to, for example, the optical characteristics of a coating film formed using the resultant coating composition. Particularly, by controlling the number average particle size to 100 nm or less, the transparency of the resultant coating film can be greatly improved. Note that the number average particle size herein of component (A) (hereinafter, sometimes simply referred to as the "particle size") is measured in accordance with the method described in Examples described later.

In one embodiment, the metal oxide (A) is preferably colloidal silica from a viewpoint of handling properties. The colloidal silica may be prepared by a sol-gel process, or a commercially available product may be used. In the case where colloidal silica is prepared by a sol-gel process, reference can be made to Werner Stober et al; J. Colloid and Interface Sci., 26, 62-69 (1968), Rickey D. Badley et al; Lang muir 6, 792-801 (1990); Journal of the Japan Society of Colour Material, 61[9] 488-493 (1988) and the like. Colloidal silica is a dispersion of silica, which contains silicon dioxide as a fundamental unit, in water or a water soluble solvent. The number average particle size of colloidal silica is 1 to 400 nm, preferably 1 to 100 nm, and more preferably 4 to 50 nm. When the number average particle size is 1 nm or more, the storage stability of the coating composition tends to become good. On the other hand, when the number average particle size is 400 nm or less, the transparency tends to become good.

Colloidal silica having a number average particle size within the aforementioned range can be used in the state of an aqueous dispersion regardless of whether it is acidic or basic. The liquid property can be appropriately selected depending upon the stable region of the hydrophilic compound (B) to be mixed in combination. Since a non-covalent bond between colloidal silica and the hydrophilic compound becomes strong (when both are non-covalently bonded), it is preferable that the colloidal silica is present in the acidic region with a pH of 7 or less. Examples of the acidic colloidal silica using water as a dispersion medium include commercially available products such as SNOWTEX (registered trademark)-OXS, SNOWTEX-OS, SNOWTEX-O, SNOWTEX-OL, and SNOWTEX-OYL manufactured by Nissan Chemical Industries, Ltd.; Adelite (registered trademark) AT-20Q manufactured by ADEKA CORPORATION; and Crebosol (registered trademark) 20H12 and Crebosol 30CAL25, manufactured by Clariant (Japan) K.K.

Examples of the basic colloidal silica include silica stabilized with the addition of an alkaline metal ion, an ammonium ion, or an amine. For example, it is possible to use SNOWTEX-20, SNOWTEX-30, SNOWTEX-C, SNOWTEX-C30, SNOWTEX-CM40, SNOWTEX-N, SNOWTEX-N30, SNOWTEX-K, SNOWTEX-XL, SNOWTEX-YL, SNOWTEX-ZL, SNOWTEX PS-M, SNOWTEX PS-L, and the like manufactured by Nissan Chemical Industries, Ltd. Alternatively, Adelite AT-20, Adelite AT-30, Adelite AT-20N, Adelite AT-30N, Adelite AT-20A, Adelite AT-30A, Adelite AT-40, Adelite AT-50, and the like manufactured by ADEKA CORPORATION also can be used. In addition, Crebosol 30R9, Crebosol 30R50, Crebosol 50R50, and the like manufactured by Clariant (Japan) K.K.; and Ledoux (registered trademark) HS-40, Ledoux HS-30, Ledoux LS, Ledoux SM-30, and the like manufactured by Du Pont Kabushiki Kaisha also can be used.

Examples of the colloidal silica using a water soluble solvent as a dispersion medium include MA-ST-M (a number average particle size of 20 nm to 25 nm, dispersed in methanol), IPA-ST (a number average particle size of 10 nm to 15 nm, dispersed in isopropyl alcohol), EG-ST (a number average particle size of 10 nm to 15 nm, dispersed in ethylene glycol), EG-ST-ZL (a number average particle size of 70 nm to 100 nm, dispersed in ethylene glycol), and NPC-ST (a number average particle size of 10 nm to 15 nm, dispersed in ethylene glycol monopropyl ether) manufactured by Nissan Chemical Industries, Ltd.

The colloidal silica may be used singly or in combinations of two or more. As a minor component, alumina, sodium aluminate and the like may be contained. Furthermore, the colloidal silica may contain, as a stabilizer, an inorganic base (sodium hydroxide, potassium hydroxide, lithium hydroxide, ammonia and the like), an organic base (tetramethylammonium and the like), etc.

Component (B): Hydrophilic Compound

Component (B) is contained in the coating composition in order to, for example, improve dispersibility of component (A), improve ability to retain antifogging properties/moisture resistance due to immobilization on the surface of component (A) via a non-covalent bond and/or a covalent bond, and improve the film-forming property of the coating composition.

As the hydrophilic compound used for component (B), a compound soluble and/or dispersible in water can be used from a viewpoint of dispersion stability of the coating composition. In addition to a hydrophilic group, the compound may have a hydrophobic group as long as it is soluble and/or dispersible in water. It is preferable that the compound contains a site of interaction with the metal oxide (A) from a viewpoint of durability of the coating film. Examples of such interaction sites include a hydroxyl group, an amino group, an amide group, a carboxyl group, a silanol group, a sulfo group, a polyoxyalkylene moiety, an ammonium salt moiety, a pyridinium salt moiety, and an imidazolium salt moiety.

As an embodiment, the hydrophilic compound (B) may be at least one selected from the group consisting of a nonionic compound, an anionic compound, and a zwitterionic compound. As the nonionic compound, the anionic compound and the zwitterionic compound, any of known compounds having these ionic properties can be used.

Examples of the nonionic compound include a compound having a hydroxyl group, a carboxyl group, an amide group, an amino group, or the like as a hydrophilic moiety.

Examples of the anionic compound include a compound having a carboxylic acid moiety, a sulfonic acid moiety, a phosphoric acid moiety, or a boronic acid moiety.

Examples of the zwitterionic compound include a compound having in the same molecule anionic sites such as a carboxylic acid moiety, a sulfonic acid moiety, a phosphoric acid moiety, or boronic acid and cationic sites such as a quaternary ammonium moiety, an imidazolium moiety, a pyridinium moiety, a sulfonium moiety, or a phosphonium moiety.

As an embodiment, the hydrophilic compound (B) may have one or two or more functional groups capable of reacting with an isocyanate group (which is a group possessed by the isocyanate compound (C)) in the molecule, and preferably two or more thereof. Examples of the functional group capable of reacting with the isocyanate group include a hydroxyl group, an amino group, an amide group, a carboxyl group, a silanol group, and a sulfo group.

Among them, the hydrophilic compound (B) is preferably a hydrophilic compound having at least one hydroxyl group in the molecule. A hydrophilic compound having two or more hydroxyl groups in the molecule is more preferable.

By using a hydrophilic compound having a site of interaction with the metal oxide (A), the compound is immobilized on the surface of the metal oxide (A) (for example, colloidal silica) via a non-covalent bond and/or a covalent bond, and the ability to retain antifogging properties in case of exposure to high temperature and high humidity environment or exposure to water is improved.

Further, by using a hydrophilic compound having one or two or more functional groups capable of reacting with an isocyanate group in the molecule, and preferably two or more thereof, the hydrophilic compound is immobilized in a coating film, and elution due to contact with water can be prevented.

Specifically, examples of the hydrophilic compound (B) having in the molecule two or more functional groups being the interaction sites and capable of reacting with an isocyanate group are not particularly limited, and examples thereof include alkylene glycol moiety-containing polymers such as polyoxyalkylene glycol, polyoxyalkylene phenyl ether, polyoxyalkylene alkyl aryl ether, polyoxyalkylene sorbitan fatty acid ester, polyoxyethylene oxypropylene block copolymer, polyoxyethylene oxypropylene oxyethylene triblock copolymer, and polyoxypropylene oxyethylene oxypropylene triblock copolymer; polyvinyl alcohol, polyhydroxyalkyl (meth)acrylate, and copolymers of a hydroxyalkyl (meth)acrylate with an alkyl (meth)acrylate. They may be used singly or in combinations of two or more. Among them, polyoxyethylene oxypropylene oxyethylene triblock copolymer is preferably contained in the coating composition from viewpoints of immobilization on the surface of colloidal silica, improvement of the ability to retain antifogging properties, and the film-forming property.

Generally, in a coating film obtained from a coating composition containing a metal oxide and water, the metal oxide component is present on the outermost surface. Thus, for example, in the case of using the above-described coating composition containing colloidal silica, the silica component is present on the outermost surface of the coating film.

On the other hand, in the coating film of the present invention, an elemental concentration ratio (C1s/M), which is between a carbon (C) element and a metal element and which is obtained from a metal (M) spectrum derived from the metal oxide and a C1s spectrum in an elemental analysis of the surface using XPS, is within the range of 0.2 to 10. When C1s/M is 0.2 or more, the degree of exposure of the metal oxide on the coating film surface becomes smaller, contamination due to foreign matter is suppressed in case of exposure to high temperature and high humidity environment, and the antifogging properties are maintained at a desired level. When C1s/M is 10 or less, the amount of an organic component not immobilized on the surface of the metal oxide becomes smaller, and the water resistance is maintained at a desired level.

In addition, when a relative elemental concentration of C element obtained from the C1s spectrum derived from carbon-oxygen bonds and/or carbon-nitrogen bonds in the elemental analysis of the surface using XPS is within the range of 5 to 50 atomic %, the antifogging properties and hydrophilicity of the coating film are further improved. When the relative elemental concentration is 5 atomic % or more, the density of the hydrophilic group on the coating film surface becomes larger, and the hydrophilicity and the antifogging properties are improved. When the relative elemental concentration is 50 atomic % or less, the solubility in water is maintained in a desired range, and the water resistance is improved.

In elemental analysis of the surface of the coating film using XPS, the lower limit of C1s/M is more preferably 0.3 or more and still more preferably 0.4 or more. The upper limit thereof is more preferably 8 or less. In other words, C1s/M may be in the range of 0.2 to 8, in the range of 0.3 to 10, in the range of 0.3 to 8, in the range of 0.4 to 10, or in the range of 0.4 to 8.

Further, in the elemental analysis of the surface of the coating film using XPS, a lower limit of the relative elemental concentration of the C1s spectrum derived from carbon-oxygen bonds and/or carbon-nitrogen bonds is more preferably 10 atomic % or more. The upper limit thereof is more preferably 40 atomic % or less. In other words, the relative elemental concentration of the C1s spectrum derived from carbon-oxygen bonds and/or carbon-nitrogen bonds may be in the range of 5 to 40 atomic %, in the range of 10 to 50 atomic %, or in the range of 10 to 40 atomic %.

The elemental analysis of the surface of the coating film using XPS can be carried out using the following device under the following measurement conditions, for example.

For example, Verasa probe II manufactured by ULVAC-PHI, Inc. may be used, and monoAlK• (15 kV×3.3 mA) may be used as an excitation source. A mask of 1 mm×2 mm is placed on a surface of a coating film of a measurement sample to set a measurement range.

A photoelectron takeoff angle is 45°. For a take-in area, a survey scan ranges from 0 to 1,100 eV, and a narrow scan is C1s, N1s, Si2p, and O1s. For pass energy, survey scan is 117.5 eV, and narrow scan is 46.95 eV.

In one embodiment, a method for controlling C1s/M to the above range in the coating film can be achieved by covering the surface of the metal oxide contained in the coating film with a component containing C atoms and having a site of interaction with the metal oxide.

Examples of the component containing C atoms include, but are not limited to, the above-described hydrophilic compounds and organic components having sites of interaction with other metal oxides. Examples of organic components having interaction with other metal oxides include organometallic oxides such as organosilicon compounds, organotitanium compounds, and organozirconium compounds. Among them, the component containing C atoms is preferably a hydrophilic compound. C1s/M can be controlled by setting the contents of the above components in certain ranges with respect to the surface area of the metal oxide.

Examples of the C1s peak include a peak attributed to hydrocarbon observed around 283 to 285 eV, a peak attributed to ether bonds observed around 285 to 287 eV, a peak attributed to amide bonds observed around 288 eV, and a peak attributed to urethane bonds observed around 288 to 290 eV.

A method for controlling the range of the C1s spectrum derived from carbon-oxygen bonds and carbon-nitrogen bonds to the range of 5 to 50 atomic % can be achieved by adjusting the amount of carbon-oxygen bonds and carbon-nitrogen bonds contained in the hydrophilic compound.

As a method of covering the surface of the metal oxide with an organic component such as a hydrophilic compound, for example, it is preferable that the organic component has such a content that a coverage (P) of a hydrophilic compound (B) to a metal oxide (A) calculated from a number average particle size ($D_A$) of (A), a density ($\rho_A$) of (A), a weight ratio ($W_B$) of (B) to (A), an average particle size ($D_B$) of (B), and a density ($\rho_B$) of (B) is controlled to the range of 30% or more and less than 1000% from viewpoints of the ability to retain antifogging properties and the water resistance. The coverage (P) is more preferably 60% or more and less than 300%, and still more preferably 80% or more and less than 200%.

$$P(\%) = \frac{100 \times D_A \rho_A W_B}{4 D_B \rho_B}$$

The average particle size ($D_B$) of the hydrophilic compound (B) can be calculated from the molecular weight and density of the hydrophilic compound (B). When the coverage (P) is 30% or more, the exposure amount of the metal oxide on the coating film surface becomes smaller, and the antifogging properties are maintained even when the coating film is exposed to high temperature and high humidity environment. Further, when the coverage (P) is 30% or more, the stability of the coating composition is maintained, and it is prevented that the coating composition aggregates and precipitates over time.

When the coverage (P) is less than 1000%, uneven distribution on the coating film surface of the hydrophilic compound (B) not immobilized on the surface of the metal oxide is suppressed, and the water resistance is maintained at a desired level.

Here, the weight ratio ($W_B$) of (B) to (A) depends on the particle sizes of (A) and (B). When the particle size of (A) is 1 to 400 nm, $0.004 < W_B < 50$ is required for the coverage of 30% or more and less than 1000%, and $0.01 < W_B < 10$ is required for the coverage of 80% or more and less than 200%.

The hydrophilic compound (B) preferably has an HLB value (hydrophilic-lipophilic balance) of 2 to 14 as determined by a Griffin method. When the HLB value is 2 or more, the solubility in water is maintained at a predetermined level, so that the compound is uniformly dispersed in an aqueous solution, and the appearance of the resultant coating film is well maintained, which is preferable. When the HLB value is 14 or less, interaction with metal oxide is retained, and the ability to retain antifogging properties can be developed by immobilization on the metal oxide. The immobilization (i.e. the presence or absence of the immobilization) by a non-covalent bond between the metal oxide and the hydrophilic compound in an aqueous solution can be measured (detected) by the presence or absence of particle size change by particle size measurement and the presence or absence of surface tension change by surface tension measurement. The HLB value of the hydrophilic compound (B) is more preferably 2 to 12.

A solid content of the coating composition used for preparing the coating film of the present invention is preferably 15% by mass or more. When the solid content of the coating composition is 15% by mass or more, a network formed by the non-covalent bond and/or the covalent bond between component (A) and component (B) becomes strong, and therefore, it is preferable from viewpoints of water resistance and moisture resistance.

The pH of the coating composition is preferably less than 8 and more preferably less than 7. When the pH of the coating composition is less than 8, interaction between the metal oxide and the hydrophilic compound is strengthened. A coating film obtained from such a coating composition is excellent in water resistance and moisture resistance.

In preparing the coating composition, it is preferable that the hydrophilic compound and the metal oxide are previously mixed, and the mixture is then diluted with water to be prepared to a desired concentration. The hydrophilic compound is firmly bonded to the surface of the metal oxide by previously mixing the hydrophilic compound and the metal oxide, and a coating film obtained from such a coating composition has good water resistance and good moisture resistance.

The content of water in the coating composition is usually 85% by mass or less based on the total amount of the composition. The lower limit of the water content is not particularly limited, but is usually 50% by mass or more.

Component (C): Isocyanate Compound

The coating composition for forming the coating film according to the present invention may contain, in addition to components (A) and (B), an isocyanate compound as component (C). It is preferable that the coating composition (and the coating film of the present invention formed therefrom) further contains an isocyanate compound as component (C) from viewpoints of improving adhesion to a substrate and improving scratch resistance.

The isocyanate compound (C) in the present invention means a compound having at least one isocyanate group in one molecule. The isocyanate compound (C) may be a compound having two or more isocyanate groups in one molecule.

Examples of the isocyanate compound (C) include aliphatic diisocyanates such as 1,4-tetramethylene diisocyanate, ethyl (2,6-diisocyanato)hexanoate, 1,6-hexamethylene diisocyanate, 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, and 2-isocyanatoethyl (2,6-diisocyanato)hexanoate; alicyclic diisocyanates such as 1,3- or 1,4-bis(isocyanatomethylcyclohexane), 1,3- or 1,4-diisocyanatocyclohexane, 3,5,5-trimethyl(3-isocyanatomethyl) cyclohexyl isocyanate, dicyclohexylmethane-4,4'-diisocyanate, and 2,5- or 2,6-diisocyanatomethylnorbornane; alicyclic triisocyanates such as 2,5- or 2,6-diisocyanatomethyl-2-isocyanate propylnorbornane; aralkylene diisocyanates such as m-xylylene diisocyanate and α,α,α'α'-tetramethyl-m-xylylene diisocyanate; aromatic diisocyanates such as m- or p-phenylene diisocyanate, tolylene-2,4- or 2,6-diisocyanate, diphenylmethane-4,4'-diisocyanate, naphthalene-1,5-diisocyanate, diphenyl-4,4'-diisocyanate, 4,4'-diisocyanato-3,3'-dimethyldiphenyl, 3-methyl-diphenylmethane-4,4'-diisocyanate, or diphenyl ether-4,4'-diisocyanate; aromatic triisocyanates such as triphenylmethane triisocyanate and tris(isocyanatophenyl)thiophosphate; diisocyanates or polyisocyanates having an urethodione structure obtained by cyclodimerization of isocyanate groups of the diisocyanate or triisocyanate as described above; polyisocyanates having an isocyanurate structure obtained by cyclotrimerization of isocyanate groups of the diisocyanate or triisocyanate as described above; polyisocyanates having a biuret structure obtained by reacting the diisocyanate or triisocyanate as described above with water; polyisocyanates having an oxadiazinetrione structure obtained by reacting the diisocyanate or triisocyanate as described above with carbon dioxide; and polyisocyanate obtained by reacting the diisocyanate or triisocyanate as described above with an active hydrogen containing compound, such as a polyhydroxy compound, a polycarboxy compound, and a polyamine compound. They may be used singly or in combinations of two or more. The isocyanate compound may be a blocked polyisocyanate obtained by reacting an isocyanate group with a blocking agent. Examples of the blocking agent include oximes, pyrazoles, caprolactams, active methylenes, alcohols, phenols, and phenol derivatives.

Among the above polyisocyanate compounds, an aliphatic or alicyclic diisocyanate, or triisocyanate, an aralkylene diisocyanate or a polyisocyanate derived therefrom is preferred from viewpoints of weather resistance and pot life. As the polyisocyanate, those having, in molecules thereof, a biuret structure, an isocyanurate structure, a urethane structure, a urethodione structure, an allophanate structure, or the like are preferable. Those having a biuret structure are often excellent in adhesiveness. Those having an isocyanurate structure are often excellent in weather resistance. Those having a urethane structure prepared using an alcohol compound having a long side chain are often excellent in elasticity and extensibility. Those having an urethodione structure or allophanate structure are often low in viscosity.

From a viewpoint of water dispersibility, the isocyanate compound (C) used in the present invention is preferably a hydrophilic polyisocyanate composition (c1) obtained by reacting a polyisocyanate compound having two or more isocyanate groups in one molecule with hydroxyl group-containing hydrophilic compound having a nonionic and/or ionic hydrophilic group such that an equivalent ratio of isocyanate group/hydroxyl group is within the range of 1.05 to 1000. The equivalent ratio is more preferably in the range of 2 to 200 and more preferably in the range of 4 to 100. When the equivalent ratio is 1.05 or more, the content of isocyanate groups in the hydrophilic polyisocyanate composition (c1) becomes higher than a predetermined level, so that the number of crosslinking points in a crosslinkable aqueous coating composition increases, and the curing rate becomes larger, or strength of a coating such as a coating film is improved, which is preferable. When the equivalent ratio is 1000 or less, hydrophilicity is developed, which is preferable.

As the hydrophilic polyisocyanate composition (c1) as described above, those in which a hydrophilic group is introduced by a conventionally known method can be used without any particular limitation. Examples thereof include a reaction product of a compound represented by the general formula $R^1O(R^2O)_n$—H (wherein $R^1$ represents an alkyl group having 1 to 30 carbon atoms or a group containing two or more aromatic rings, and $R^2$ represents an alkylene group having 1 to 5 carbon atoms. n is an integer from 2 to 250) and a polyisocyanate compound, a reaction product of a vinyl polymer having a hydrophilic group and a hydroxyl group and a polyisocyanate compound, and a reaction product of an emulsifier obtained by reacting an alkoxypolyalkylene glycol with a dialkanolamine and a polyisocyanate compound. Among them, since the reaction product of the compound represented by the general formula $R^1O$—$(R^2O)_n$—H (wherein $R^1$ represents an alkyl group having 1 to 30 carbon atoms or a group containing two or more aromatic rings, and $R^2$ represents an alkylene group having 1 to 5 carbon atoms. n is an integer from 2 to 250) and the polyisocyanate compound, the reaction product of the vinyl polymer having a hydrophilic group and a hydroxyl group and the polyisocyanate compound are excellent in water dispersibility, and therefore it is particularly preferable.

Examples of the compound represented by the general formula $R^1O$—$(R^2O)$—H (wherein $R^1$ represents an alkyl group having 1 to 30 carbon atoms or a group containing two or more aromatic rings, and $R^2$ represents an alkylene group having 1 to 5 carbon atoms. n is an integer from 2 to 250) include alkoxypolyalkylene glycols such as polymethylene glycol monomethyl ether, polyethylene glycol monomethyl ether, polyethylene glycol monoethyl ether, polyethylene glycol monopropyl ether, polyethylene glycol monolauryl ether, polyoxyethylene-oxypropylene (random and/or block) glycol monomethyl ether, and polyoxyethylene-oxytetramethylene (random and/or block) glycol polybutylene glycol monomethyl ether, and nonionic surfactants having a group containing two or more aromatic rings such as a (mono- to penta-) styrenated phenyl group, a mono (or di, tri) styrylmethyl-phenyl group, a tribenzyl phenyl group, and a β-naphthyl group. Among them, polyethylene glycol monomethyl ether and a nonionic surfactant having a (mono- to penta-) styrenated phenyl group are preferable from viewpoints of self-emulsification ability and pot life.

Among the compounds represented by the general formula $R^1O$—$(R^2O)_n$—H (wherein $R^1$ represents an alkyl group having 1 to 30 carbon atoms or a group containing two or more aromatic rings, and $R^2$ represents an alkylene group having 1 to 5 carbon atoms. n is an integer from 2 to 250), those having a molecular weight of preferably 100 to 10000, more preferably 300 to 5000 can be preferably used.

Examples of the hydrophilic group of the vinyl polymer having a hydrophilic group and a hydroxyl group include various known anionic groups, cationic groups, and nonionic groups, and nonionic groups are preferable. When the hydrophilic group is a nonionic group, the pot life of the coating composition is markedly prolonged, and the particle size of polyisocyanate oil droplets is reduced, so that the water resistance of a coating film to be formed can be further improved.

Specific examples of the vinyl polymer having a hydrophilic group and a hydroxyl group include an acrylic polymer, a fluoroolefin polymer, a vinyl ester polymer, an aromatic vinyl polymer, and a polyolefin polymer. Among them, an acrylic polymer is preferable from a viewpoint of the weather resistance of a coating film to be formed.

A polymerization method for obtaining an acrylic polymer suitable as the vinyl polymer having a hydrophilic group and a hydroxyl group is not particularly limited, and examples thereof include suspension polymerization, emulsion polymerization, and solution polymerization. It is preferable that the acrylic polymer is obtained by solution polymerization of an ethylenically unsaturated monomer (i) having a hydrophilic group and an ethylenically unsaturated monomer (ii) having a hydroxyl group. If necessary, other ethylenically unsaturated monomers (iii) copolymerizable therewith can also be used.

Examples of the ethylenically unsaturated monomer (i) having a hydrophilic group include alkoxypolyalkylene glycol (meth)acrylates such as methoxypolyethylene glycol (meth)acrylate, ethoxypolyethylene glycol (meth)acrylate, and butoxy polyethylene glycol (meth)acrylate, polyalkylene glycol di(meth)acrylates such as polyethylene glycol di(meth)acrylate, (meth)acrylamide monomers, and anionic vinyl monomers. Ethylenically unsaturated monomers having both a hydrophilic group and a hydroxyl group in the molecule like polyalkylene glycol (meth)acrylates can also be used. They may be used singly or in combinations of two or more.

Examples of the other ethylenically unsaturated monomers (iii) copolymerizable therewith include (meth)acrylic esters, aromatic vinyl compounds, vinyl cyanides, carbonyl group-containing vinyl monomers, olefins, dienes, haloolefins, vinyl ethers, and allyl esters. They may be used singly or in combinations of two or more.

As the vinyl polymer containing a hydrophilic group and a hydroxyl group, it is possible to preferably use those having a weight average molecular weight (according to a GPC determination method in terms of polystyrene) of preferably 2000 to 100000, more preferably 3000 to 50000.

A ratio (X) of the polyisocyanate compound (C) to the hydrophilic compound (B) in the coating composition (calculated as (X)=(C)/(B) in terms of a solid content weight ratio) is preferably 0.02 or more, more preferably 0.1 or more, from a viewpoint of adhesion between a coating film to be formed and a substrate. From a viewpoint of stability (gelation, increase in viscosity) of the coating composition, the ratio (X) is preferably 10 or less, and from viewpoints of low water contact angle and high transparency (low HAZE) of a coating film to be formed, the ratio (X) is more preferably 5 or less. The ratio (X) may be 0.02 or more and 10 or less, 0.02 or more and 5 or less, 0.1 or more and 10 or less, or 0.1 or more and 5 or less.

The viscosity of the isocyanate compound (C) is preferably 1 to 50000 mPa·s (20° C.), more preferably 1 to 20000 mPa·s (20° C.), still more preferably 10 to 10000 mPa·s (20° C.). The viscosity of the isocyanate compound (C) may be 10 to 50000 mPa·s (20° C.), 10 to 20000 mPa·s (20° C.), or 10 to 10000 mPa·s (20° C.). The viscosity of the polyisocyanate compound (C) is preferably 50000 mPa·s or less because it is easy to disperse in water. The viscosity here can be measured with a commonly used E type viscometer. In one embodiment, the viscosity is measured at a rotation speed of 2.5 rpm at 25° C. using an E type viscometer (RE-80U, manufactured by Toki Sangyo Co., Ltd.).

Component (D): Polymer Particles

The coating composition for forming the coating film according to the present invention may contain, in addition to components (A) and (B), polymer particles as component (D). The coating composition may further contain, in addition to components (A), (B) and (C), polymer particles as component (D).

The coating composition (and the coating film of the present invention formed therefrom) preferably further contains polymer particles as component (D). In one embodiment, component (D) is polymer particles obtained by polymerizing a polymerization stock solution containing component (d1): a hydrolyzable silicon compound, component (d2): a vinyl monomer containing at least one functional group selected from the group consisting of a hydroxyl group, a carboxyl group, an amide group, an amino group, and an ether group, component (d3): an emulsifier, and component (d4): water.

In one embodiment, component (A) interacts with component (D) and can act as a curing agent for component (D). Examples of the interaction include formation of a hydrogen bond between a hydroxyl group generally contained in component (A) and a functional group selected from the group consisting of a hydroxyl group, a carboxyl group, an amide group, an amino group, and an ether group contained in component (D) and condensation (chemical bonding) between the hydroxyl group generally contained in component (A) and a polymerization product of component (d1) constituting component (D). It is preferable that component (A) forms a continuous layer between particles of component (D) while interacting with component (D). Thereby, the adhesion, water resistance, and weather resistance of the resulting coating film can be further improved.

As component (d1), a compound represented by the following formula (4) or a condensation product thereof, a silane coupling agent and the like can be used.

$$SiW_xR_y \qquad (4)$$

(In the formula (4), W represents at least one group selected from an alkoxy group having 1 to 20 carbon atoms, a hydroxyl group, an acetoxy group having 1 to 20 carbon atoms, a halogen atom, a hydrogen atom, an oxime group having 1 to 20 carbon atoms, an enoxy group, an aminoxy group, and an amide group. R represents at least one hydrocarbon group selected from a linear or branched alkyl group having 1 to 30 carbon atoms, a cycloalkyl group having 5 to 20 carbon atoms, and an aryl group having 6 to 20 carbon atoms that is not substituted or substituted with an alkyl group having 1 to 20 carbon atoms, an alkoxy group having 1 to 20 carbon atoms, or a halogen atom. x is an integer of 1 or more and 4 or less, and y is an integer of 0 or more and 3 or less. x+y=4.)

The silane coupling agent means a compound in which a functional group having reactivity with an organic substance such as a vinyl polymerizable group, an epoxy group, an amino group, a methacryl group, a mercapto group, or an isocyanate group exists in the molecule.

Specific examples of the compound represented by the formula (4) include tetraalkoxysilanes such as tetramethoxysilane, tetraethoxysilane, tetra-n-propoxysilane, tetraisopropoxysilane and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, allyltrimethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-(meth)acryloyloxypropyltri-n-propoxysilane, 3-(meth)acryloyloxypropyltriisopropoxysilane, 3-ureidopropyltrimethoxysilane and 3-ureidopropyltriethoxysilane; dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, diisopropyldimethoxysilane, diisopropyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane and 3-(meth)acryloyloxypropylmethyldimethoxysilane; and monoalkoxysilanes such as trimethylmethoxysilane and trimethylethoxysilane. Additionally, they may be used singly or in combinations of two or more.

As component (d1), a silicon alkoxide having a phenyl group (for example, phenyltrimethoxysilane, phenyltriethoxysilane, and diphenyldimethoxysilane) can be used. A silicon alkoxide having a phenyl group is preferably used because polymerization stability in the presence of water and an emulsifier becomes excellent.

Component (d1) may be used in combination with a silane coupling agent having a thiol group or a hydrolyzable silicon compound having a vinyl polymerizable group as component (d1-1). These are preferably used because the long-term antifouling properties of the resultant coating film become excellent. As the silane coupling agent having a thiol group, 3-mercaptopropyltrimethoxysilane and 3-mercaptopropyltriethoxysilane can be used, for example.

Examples of component (d1-1) usable include a silane coupling agent having a vinyl polymerizable group such as 3-(meth)acryloxypropyltrimethoxysilane, 3-(meth)acryloxypropyltriethoxysilane, 3-(meth)acryloyloxypropylmethyldimethoxysilane, 3-(meth)acryloyloxypropyltri-n-propoxysilane, 3-(meth)acryloyloxypropyltriisopropoxysilane, vinyltrimethoxysilane, vinyltriethoxysilane, allyltrimethoxysilane and 2-trimethoxysilyl ethyl vinyl ether.

These silane coupling agents can produce a chemical bond via copolymerization or chain transfer reaction with component (d2) described later. Therefore, if a silane coupling agent having a vinyl polymerizable group or a thiol group is mixed or complexed with component (d1) described above, a polymerization product of component (d1) and a polymerization product of component (d2) described later can be complexed by a chemical bond. In component (d1-1), examples of the "vinyl polymerizable group" include a vinyl group and an allyl group, and of these, 3-(meth)acryloxypropyl group is preferable.

Component (d1) may include a cyclic siloxane oligomer as a component (d1-2). By using component (d1-2), the flexibility of a composite obtained from the coating film and the substrate is increased, so that the use is suitable for hard coating.

Examples of the cyclic siloxane oligomer usable include compounds represented by the following formula (5):

(In the formula (5), R' represents at least one selected from the group consisting of a hydrogen atom, a linear or branched alkyl group having 1 to 30 carbon atoms, a cycloalkyl group having 5 to 20 carbon atoms, and an aryl group having 6 to 20 carbon atoms unsubstituted or substituted with an alkyl group having 1 to 20 carbon atoms, an alkoxy group having 1 to 20 carbon atoms or a halogen atom. m is an integer, and $2 \leq m \leq 20$.)

Among the cyclic siloxane oligomers, in view of reactivity and the like, a cyclic dimethylsiloxane oligomer such as octamethylcyclotetrasiloxane is preferable.

If component (d1) is used as a condensate, the weight average molecular weight (by a GPC method in terms of polystyrene) of the condensate is preferably 200 to 5000 and more preferably 300 to 1000. A ratio (d1)/(D) of the mass of component (d1) of the polymerization stock solution to the mass of the polymer particles of component (D) is preferably 0.01/100 to 80/100 and more preferably 0.1/100 to 70/100 from a viewpoint of polymerization stability. On the other hand, a ratio (d1-1)/(D) of the mass of component (d1-1) of the polymerization stock solution to the mass of the polymer particles of component (D) is preferably 0.01/100 to 20/100 and more preferably 0.5/100 to 10/100 from a viewpoint of polymerization stability.

A mass ratio (d1-1)/(d2) of component (d1-1) of the polymerization stock solution to component (d2) is preferably 0.1/100 to 100/100 and more preferably 0.5/100 to 50/100 from a viewpoint of polymerization stability. On the other hand, a ratio (d1-2)/(D) of the mass of component (d1-2) of the polymerization stock solution to the mass of the polymer particles of component (D) is preferably 0.01/100 to 20/100 and more preferably 0.5/100 to 5/100 from a viewpoint of hydrophilicity. A mass ratio (d1-2)/(d2) of component (d1-2) of the polymerization stock solution to component (d2) is preferably 0.5/100 to 50/100 and more preferably 1.0/100 to 20/100 from a viewpoint of polymerization stability.

Next, examples of the hydroxy group-containing vinyl monomer serving as component (d2) include hydroxyalkyl (meth)acrylates such as 2-hydroxyethyl(meth)acrylate, 2-hydroxypropyl(meth)acrylate, and 4-hydroxybutyl(meth)acrylate; hydroxy group-containing vinyl ethers such as 2-hydroxyethylvinyl ether and 4-hydroxybutylvinyl ether; hydroxy group-containing allyl ethers such as 2-hydroxyethyl allyl ether; monoesters of a polyoxyalkylene glycol obtained from a polyether polyol such as polyethylene glycol and an unsaturated carboxylic acid such as (meth)acrylic acid; adducts of the hydroxy group-containing monomer as described above and a lactone such as ε-caprolactone; adducts of an epoxy group-containing unsaturated monomer such as glycidyl(meth)acrylate and an acid such as acetic acid; and hydroxy group-containing vinyl monomers such as adducts of an unsaturated carboxylic acid such as (meth) acryl acid and a monoepoxy compound (except for α-olefin epoxide) such as "Cardura-E" (trade name, manufactured by Shell in Netherland).

Examples of the carboxyl group-containing vinyl monomer serving as component (d2) include unsaturated carboxylic acids such as (meth)acrylic acid, 2-carboxyethyl(meth) acrylate, crotonic acid, itaconic acid, maleic acid, and fumaric acid; monoesters (half esters) of an unsaturated dicarboxylic acid and a saturated monoalcohol such as monomethyl itaconate, mono-n-butyl itaconate, monomethyl maleate, mono-n-butyl maleate, monomethyl fumalate, and mono-n-butyl fumalate; monovinyl esters of a saturated dicarboxylic acid such as monovinyl adipate and monovinyl succinate; a product of an addition reaction between a saturated polycarboxylic acid anhydride such as succinic anhydride, glutaric anhydride, phthalic anhydride, and trimellitic anhydride, and the hydroxy group-containing vinyl monomer as described above; and monomers obtained by an addition reaction of the carboxyl group-containing monomer as described above and a lactone.

As the amide group-containing vinyl monomer serving as component (d2), an N-alkyl- or N-alkylene-substituted (meth)acrylamide can be used, for example. More specifically, it is possible to use, for example, N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrrolidine, N-methacryloylpyrrolidine, N-acryloylpiperidine, N-methacryloylpiperidine, N-acryloylhexahydroazepine, N-acryloylmorpholine, N-methacryloylmorpholine, N-vinylpyrrolidone, N-vinylcaprolactam, N,N'-methylenebisacrylamide, N,N'-methylene bismethacrylamide, N-vinylacetamide, diacetoneacrylamide, diacetonemethacrylamide, N-methylolacrylamide and N-methylolmethacrylamide.

Examples of the amino group-containing vinyl monomer serving as component (d2) include tertiary amino group-containing (meth)acrylates such as 2-dimethylaminoethyl (meth)acrylate, 2-diethylaminoethyl(meth)acrylate, 2-di-n-propylaminoethyl(meth)acrylate, 3-dimethylaminopropyl (meth)acrylate, 4-dimethylaminobutyl(meth)acrylate, and N-[2-(meth)acryloyloxy]ethyl morpholine; tertiary amino group-containing aromatic vinyl monomers such as vinylpyridine, N-vinylcarbazole, and N-vinylquinoline; tertiary amino group-containing (meth)acrylamides such as N-(2-dimethylamino)ethyl(meth)acryl amide, N-(2-diethylamino)ethyl(meth)acrylamide, N-(2-di-n-propylamino)ethyl (meth)acrylamide, N-(3-dimethylamino)propyl(meth)acrylamide, N-(4-dimethylamino)butyl(meth)acrylamide, and N-[2-(meth)acrylamide]ethylmorpholine; tertiary amino group-containing crotonic acid amides such as N-(2-dimethylamino)ethylcrotonic acid amide, N-(2-di ethylamino) ethyl crotonic acid amide, N-(2-di-n-propylamino)ethylcrotonic acid amide, N-(3-dimethylamino)propylcrotonic acid amide, and N-(4-dimethylamino)butylcrotonic acid amide; and tertiary amino group-containing vinyl ethers such as 2-dimethylaminoethyl vinyl ether, 2-diethylaminoethyl vinyl ether, 3-dimethylaminopropyl vinyl ether, and 4-dimethylaminobutyl vinyl ether.

Examples of the ether group-containing vinyl monomer serving as component (d2) include vinyl monomers such as vinyl ethers having a polyether chain in a side chain, such as a polyoxyethylenealkyl ether, a polyoxyethylenealkylphenyl ether, a higher fatty acid ester of a polyoxyethylene, and a polyoxyethylene-polyoxypropylene block copolymer, allyl ethers, and (meth)acrylates. Specifically, it is possible to use, for example, BLEMMER PE-90, PE-200, PE-350, PME-100, PME-200, PME-400 and AE-350 (trade names, manufactured by NOF Corporation); and MA-30, MA-50, MA-100, MA-150, RA-1120, RA-2614, RMA-564, RMA-568, RMA-1114 and MPG130-MA (trade names, manufactured by Nippon Nyukazai Co., Ltd.). The number of oxyethylene units of the polyoxyethylene chain herein is preferably 2 to 30. If the number of oxyethylene units is 2 or more, suitable flexibility can be obtained in a coating film, and if the number is 30 or less, excessive softening of the coating film is suppressed, so that blocking resistance is maintained.

A vinyl monomer serving as component (d2) preferably has a secondary amide group and/or a tertiary amide group from a viewpoint of further improving hydrogen bonding to other components.

A ratio (d2)/(D) of the mass of component (d2) of the polymerization stock solution to the mass of the polymer particles of component (D) is preferably 0.1/1 to 0.5/1 and more preferably 0.2/1 to 0.4/1 from a viewpoint of polymerization stability. A ratio (d2)/(A) of the mass of component (d2) of the polymerization stock solution to the mass of the metal oxide of component (A) is preferably 0.1/1 to 1/1 and more preferably 0.2/1 to 0.8/1 from viewpoints of hydrogen bonding to component (A) and blending stability.

Next, examples of the emulsifier serving as component (d3) include an acidic emulsifier such as an alkylbenzene sulfonic acid, an alkyl sulfonic acid, an alkylsulfosuccinic acid, polyoxyethylenealkyl sulfuric acid, polyoxyethylene alkylarylsulfuric acid, and polyoxyethylene distyrylphenylether sulfonic acid; an anionic surfactant such as an alkaline metal (e.g., Li, Na, K) salt of an acidic emulsifier, an ammonium salt of an acidic emulsifier, and fatty acid soap; a cationic surfactant of a quaternary ammonium salt, a pyridinium salt, and an imidazolinium salt such as an alkyltrimethylammonium bromide, an alkylpyridinium bromide and imidazolinium laurate; and a nonionic surfactant such as a polyoxyethylene alkylaryl ether, a polyoxyethylene sorbitan fatty acid ester, a polyoxyethylene oxypropylene block copolymer, and polyoxyethylene distyryl phenyl ether. They may be used singly or in combinations of two or more.

As component (d3), from viewpoints of improving water dispersion stability of the resultant component (D) and improving long-term antifouling properties of the resultant coating film, a reactive emulsifier having a radical polymerizable double bond is preferably used. As the reactive emulsifier, more specifically, it is possible to use, for example, a vinyl monomer having a sulfonic acid group or a sulfonate group, a vinyl monomer having a sulfuric acid ester group, or an alkali metal salt or ammonium salt thereof; a vinyl monomer having a nonionic group such as polyoxyethylene and a vinyl monomer having a quaternary ammonium salt.

Examples of the vinyl monomer having a sulfonic acid group or a sulfonate group include a compound having a radical polymerizable double bond and having a substituent selected from the group consisting of an alkyl group having 1 to 20 carbon atoms, an alkyl ether group having 2 to 4 carbon atoms, a polyalkyl ether group having 2 to 4 carbon atoms, a phenyl group, a naphthyl group and a succinic acid group, which are partly substituted with a substituent such as an ammonium salt, sodium salt or potassium salt of a sulfonic acid group; and a vinyl sulfonate compound having a vinyl group to which a substituent such as an ammonium salt, a sodium salt or a potassium salt of a sulfonic acid group is bound.

Examples of the vinyl monomer having a sulfuric acid ester group include a compound having a radical polymerizable double bond and a substituent selected from the group consisting of an alkyl group having 1 to 20 carbon atoms, an alkyl ether group having 2 to 4 carbon atoms, a polyalkyl ether group having 2 to 4 carbon atoms, a phenyl group and a naphthyl group, which are partly substituted with a substituent such as an ammonium salt, sodium salt or potassium salt of a sulfonic acid ester group.

As the compound having a succinic acid group partly substituted with a substituent such as an ammonium salt, sodium salt or potassium salt of a sulfonic acid group, an allyl sulfo succinate can be used specifically. More specifically, ELEMINOL JS-2 (trade name) (manufactured by Sanyo Chemical Industries, Ltd.) and Latemul S-120, S-180A, and S-180 (trade names) (manufactured by Kao Corp.) can be used.

As the compound having an alkyl ether group having 2 to 4 carbon atoms or a polyalkyl ether group having 2 to 4 carbon atoms partly substituted with a group as an ammonium salt, sodium salt, or potassium salt of a sulfonic acid group, specifically it is possible to use, for example, Aqualon HS-10 or KH-1025 (trade name) (manufactured by Dai-ichi Kogyo Seiyaku Co., Ltd.) and ADEKA REASOAP SE-1025N or SR-1025 (trade name) (manufactured by ADEKA CORPORATION).

Specific examples of the vinyl monomer having a nonion group include α-[1-[(allyloxy)methyl]-2-(nonylphenoxy)ethyl]-ω-hydroxypolyoxyethylene (trade names: e.g., ADEKA REASOAP NE-20, NE-30 and NE-40 manufactured by ADEKA CORPORATION) and polyoxyethylene alkylpropenyl phenyl ether (trade names: e.g., Aqualon RN-10, RN-20, RN-30 and RN-50, Dai-ichi Kogyo Seiyaku Co., Ltd.).

The amount of component (d3) in the polymerization stock solution relative to 100 parts by mass of the polymer particles of component (D) is preferably 10 parts by mass or less and more preferably 0.001 to 5 parts by mass, from a viewpoint of polymerization stability.

In one embodiment, component (D) of the coating film is polymer particles obtained by polymerizing a polymerization stock solution containing components (d1) to (d3) described above and water as a component (d4). The amount of component (d4) as the content thereof in the polymerization stock solution is preferably 30 to 99.9% by mass, from a viewpoint of polymerization stability. To the polymerization stock solution, in addition to components (d1) to (d4), various components can be further added. For example, as component (d5), another vinyl monomer copolymerizable with component (d2) may be mixed in the polymerization stock solution. Use of component (d5) is suitable from a viewpoint of controlling the properties of a polymerization product to be produced (glass transition temperature, molecular weight, hydrogen bonding ability, polarity, dispersion stability, weather-resistance, compatibility with a polymerization product of the hydrolyzable silicon compound (d1) and the like).

As component (d5), an acrylate, a methacrylate, an aromatic vinyl compound, and vinyl cyanides can be used, for example, and in addition, monomers having a functional group such as an epoxy group-containing vinyl monomer, a carbonyl group-containing vinyl monomer, and an anionic vinyl monomer can be used. The proportion of component (d5) in the total vinyl monomers in the polymerization stock solution preferably falls within the range of 0.001 to 30% by mass and more preferably 0.05 to 10% by mass. It is preferable that the proportion of component (d5) is set within these ranges of mass % from a viewpoint of controlling properties of the polymerization product to be produced (glass transition temperature, molecular weight, hydrogen bonding ability, polarity, dispersion stability, weather-resistance, compatibility with a polymerization product of the hydrolyzable silicon compound (d1) and the like).

To the polymerization stock solution, a chain transfer agent may be added. As the chain transfer agent, it is possible to use, for example, alkyl mercaptans such as n-octyl mercaptan, n-dodecyl mercaptan, and t-dodecyl mercaptan; aromatic mercaptans such as benzyl mercaptan and dodecyl benzyl mercaptan; and a thiocarboxylic acid such as thiomalic acid, a salt thereof or alkyl esters thereof, or polythioles, diisopropyl xanthogen disulfide, di(methylenetrimethylolpropane) xanthogen disulfide, thioglycol and an allyl compound such as a dimer of α-methylstyrene. The amount of the chain transfer agent relative to 100 parts by mass of the total vinyl monomers is preferably 0.001 to 30 parts by mass and more preferably 0.05 to 10 parts by mass, from a viewpoint of polymerization stability.

To the polymerization stock solution, a dispersion stabilizer may be added. Examples of the dispersion stabilizer include water soluble oligomers selected from the group consisting of a polycarboxylic acid and a sulfonate, and synthetic or naturally occurring water soluble or water dispersible polymer substances such as a polyvinyl alcohol, a hydroxyethylcellulose, starch, a maleinized polybutadiene, a maleinized alkyd resin, a polyacrylic acid (polyacrylate), polyacrylamide, and a water soluble or water dispersible acrylic resin. They may be used singly or in combinations of two or more. The amount of the dispersion stabilizer in the polymerization stock solution relative to 100 parts by mass of the polymer particles (D) is preferably 10 parts by mass or less and more preferably 0.001 to 5 parts by mass.

Polymerization of the polymerization stock solution is preferably performed in the presence of a polymerization catalyst. As the polymerization catalyst for component (d1), it is possible to use, for example, acidic compounds such as hydrogen halides such as hydrochloric acid and hydrofluoric acid, carboxylic acids such as acetic acid, trichloroacetic acid, trifluoroacetic acid, and lactic acid, sulfonic acids such as sulfuric acid and p-toluene sulfonic acid, acidic emulsifiers such as alkylbenzenesulfonic acid, alkylsulfonic acid, alkylsulfosuccinic acid, polyoxyethylene alkyl sulfuric acid, polyoxyethylene alkylaryl sulfuric acid, and polyoxyethylene distyryl phenyl ether sulfonic acid, acidic or weak acidic inorganic salt, phthalic acid, phosphoric acid, and nitric acid; basic compounds such as sodium hydroxide, potassium hydroxide, sodium methylate, sodium acetate, tetramethylammonium chloride, tetramethylammonium hydroxide, tributyl amine, diazabicycloundecene, ethylene diamine, diethylene triamine, an ethanol amine, γ-aminopropyltrimethoxysilane, and γ-(2-aminoethyl)-aminopropyltrimethoxysilane; and tin compounds such as dibutyltin octylate and dibutyltin dilaurate. Of these, a polymerization catalyst for the hydrolyzable silicon compound (d1) is preferably an acidic emulsifier having a function of not only a polymerization catalyst but also an emulsifier, particularly, an alkylbenzenesulfonic acid having 5 to 30 carbon atoms (dodecyl benzene sulfonic acid and the like).

As the polymerization catalyst for component (d2), a radical polymerization catalyst is suitable, which decomposes to form radicals by heat or a reducible substance and the like and causes addition polymerization of a vinyl monomer. Examples of such a radical polymerization catalyst preferably include a water soluble or oil soluble persulfate, a peroxide and an azobis compound. More specifically, it is possible to use, for example, potassium persulfate, sodium persulfate, ammonium persulfate, hydrogen peroxide, t-butyl hydroperoxide, t-butyl peroxybenzoate, 2,2-azobisisobutyronitrile, 2,2-azobis(2-diaminopropane) hydrochloride, and 2,2-azobis(2,4-dimethylvaleronitrile).

The amount of the polymerization catalyst in the polymerization stock solution relative to 100 parts by mass of the total vinyl monomer is preferably 0.001 to 5 parts by mass. If the increase in polymerization rate and the progress of polymerization at a temperature as low as 70° C. or less are desired, it is advantageous to use a reducing agent such as sodium bisulfite, ferrous chloride, ascorbate, and Rongalite in combination with a radical polymerization catalyst.

In one embodiment, polymerization of component (d1) and polymerization of component (d2) can be separately performed; however, they are preferably performed simultaneously because micro organic/inorganic complexation can be attained by a hydrogen bond and the like.

As a method for obtaining component (D) of the coating film according to one embodiment, so-called emulsion polymerization is suitable in which component (d1) and component (d2) are polymerized in the presence of a sufficient amount of water for the emulsifier to form a micelle. In an example of the emulsion polymerization method, component (d1) and component (d2) and further, if necessary, component (d3) are added dropwise directly or in an emulsion state, at one time, in lots or continuously, to a reactor and polymerized in the presence of a polymerization catalyst, at a pressure of preferably atmospheric pressure to 10 MPa, if necessary at a reaction temperature of about 30 to 150° C. In some cases, polymerization may be performed under conditions of pressure and temperature that are higher that the aforementioned ranges. The polymerization stock solution is preferably prepared, from a viewpoint of polymerization stability, by blending components (d1) to (d4) such that the total mass of the solid contents falls within the range of 0.1 to 70% by mass and preferably 1 to 55% by mass.

Further, in carrying out the emulsion polymerization, from a viewpoint of appropriately growing the particles or controlling the particle size, a seed polymerization method is preferably employed. In the seed polymerization method, emulsion particles (seed particles) are previously placed in an aqueous phase and then polymerization is performed. The pH of the polymerization system when the seed polymerization method is carried out is preferably 1.0 to 10.0 and more preferably 1.0 to 6.0. The pH during the polymerization can be controlled by using a pH buffer such as disodium phosphate, borax, sodium hydrogen carbonate, and ammonia.

As a method for obtaining component (D), a method comprising steps of polymerizing component (d1) and component (d2) in the presence of component (d3) and component (d4) required for polymerizing component (d1) and, if necessary, in the presence of a solvent; and then adding water thereto until a polymerization product is emulsified, can be applied.

Component (D) preferably has a core/shell structure having a core layer and one or two or more shell layers covering the core layer from a viewpoint of improving the adhesion to a substrate of a coating film formed using the resulting coating composition. As a method for forming the core/shell structure, multistage emulsion polymerization, in which emulsion polymerization is performed in multiple stages, is useful.

An example of the multistage emulsion polymerization comprises a first stage of polymerization, in the presence of component (d3) and component (d4), of at least one selected from the group consisting of component (d1), component (d2) and components (d5) to form seed particles, and a second stage of polymerization, in the presence of the seed particles, by adding a polymerization stock solution containing component (d1) and component (d2), and, if necessary, component (d5) (referred to as 2-stage polymerization method). Further, in the case where multistage emulsion polymerization consisting of three stages or more is performed, a third stage of polymerization may be performed by adding a polymerization stock solution containing component (d1) and component (d2) and, if necessary, component (d5). Such a method is preferable from a viewpoint of polymerization stability. A mass ratio (d2)/(d1) of component (d2) to component (d1) in the core layer is preferably 0.01/1 to 1/1 from a viewpoint of polymerization stability. The mass ratio (d2)/(d1) of component (d2) to component (d1) in an outermost layer of the shell layers is preferably 0.1/1 to 5/1 and more preferably 0.5/1 to 4/1.

In the two-stage polymerization method, a mass ratio of a solid content mass (M1) in the polymerization stock solution used in the first stage to a solid content mass (M2) in the polymerization stock solution to be added in the second stage is preferably (M1)/(M2)=9/1 to 1/9 and more preferably 8/2 to 2/8 from a viewpoint of polymerization stability.

As the core/shell structure, from a viewpoint of polymerization stability, it is preferable that the particle sizes are increased by the second-stage polymerization without significantly changing the particle size distribution (volume average particle size/number average particle size) of the seed particles. The volume average particle size can be measured in the same manner as in the number average particle size. The core/shell structure can be observed, for example, by a morphological observation by means of a transmission electron microscope and the like and analysis by viscoelastic measurement.

In the core/shell structure, the glass transition temperature (Tg) of the core layer is preferably 0° C. or less. When the glass transition temperature (Tg) of the core layer is within this range, as physical properties of an antifogging coating film to be obtained, the flexibility at room temperature is excellent, and cracking or the like is unlikely to occur. Tg here can be measured by a differential scanning calorimeter (DSC).

In one embodiment, the number average particle size of component (D) of the coating composition (and the coating film formed therefrom) is, for example, 10 nm to 800 nm. When a composition is formed by combining component (D) having a number average particle size of 10 nm to 800 nm with component (A) having a number average particle size of 1 nm to 400 nm, weather resistance and antifouling properties of the resulting coating film are improved. From viewpoints of optical properties and hard coat properties of the resulting coating film, the number average particle size of component (D) is preferably 20 nm to 250 nm. As a method of measuring the number average particle size of component (D), the same method as that for component (A) can be adopted.

A mass ratio (A)/(D) of component (A) to component (D) in the coating composition (and the coating film formed therefrom) is preferably 50/100 to 1000/100 and more preferably 100/100 to 300/100. By blending in this range, an antifogging coating film excellent in hydrophilicity, antifogging properties, optical characteristics, and antifouling properties can be formed. A ratio (SA)/(SB) of the surface area (SA) of all particles of component (A) to the surface area (SB) of all particles of component (B) preferably falls within the range of 0.001 to 1000. The surface area here can be calculated from the particle size of each of components (A) and (B) and the respective mass number (i.e., particle size distribution).

Component (E): Hydrolyzable Silicon Compound

The coating composition for forming the coating film according to the present invention may contain, in addition to components (A) and (B), a hydrolyzable silicon compound as component (E). The coating composition may further contain, in addition to components (A), (B) and (C), hydrolyzable silicon compound as component (E). The coating composition may further contain, in addition to components (A), (B) and (D), hydrolyzable silicon compound as component (E). The coating composition may further contain, in addition to components (A), (B), (C), and (D), hydrolyzable silicon compound as component (E).

In one embodiment, the coating composition (and the coating film formed therefrom) may further contain component (E): a hydrolyzable silicon compound represented by the following formula (6), the following formula (7), or the following formula (8). In this case, a mass ratio of component (A) to component (D) in the coating composition is, for example, A/D=50/100 to 1000/100, and a mass ratio of component (A) to component (E) is, for example, E/A=5/100 to 90/100. Hereinafter, a hydrolyzable silicon-containing compound represented by the following formula (6) is referred to as component (e1), and a hydrolyzable silicon-containing compound represented by the following formula (7) is referred to as component (e2).

$$R^1_n SiX_{4-n} \quad (6)$$

(In the formula (6), $R^1$ represents hydrogen, or an alkyl group, alkenyl group, alkynyl group or aryl group having 1 to 10 carbon atoms. A functional group such as a halogen group, a hydroxy group, a mercapto group, an amino group, a (meth)acryloyl group or an epoxy group is optionally provided on these functional groups. X represents a hydrolyzable group, and n is an integer of 0 to 3. The hydrolyzable group is not particularly limited as long as it hydrolytically produces a hydroxy group, and examples thereof include a halogen atom, an alkoxy group, an acyloxy group, an amino group, a phenoxy group, and an oxime group.)

$$X_3Si-R^2_n-SiX_3 \quad (7)$$

(In the formula (7), X represents a hydrolyzable group, $R^2$ represents an alkylene group or phenylene group having 1 to 6 carbon atoms. n is 0 or 1.)

Examples of components (e1) and (e2) usable include tetramethoxysilane, tetraethoxysilane, tetra(n-propoxy)silane, tetra(i-propoxy)silane, tetra(n-butoxy)silane, tetra(i-butoxy)silane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, dimethoxysilane, diethoxysilane, methyldimethoxysilane, methyldiethoxysilane, dimethyldimethoxysilane, dimethyldiethoxysilane, bis(trimethoxysilyl)methane, bis(triethoxysilyl)methane, bis(triphenoxysilyl)methane, bis(trimethoxysilyl)ethane, bis(triethoxysilyl) ethane, bis(triphenoxysilyl)ethane, 1,3-bis(trimethoxysilyl)propane, 1,3-bis(triethoxysilyl)propane, 1,3-bis(triphenoxysilyl)propane, 1,4-bis(trimethoxysilyl)benzene, 1,4-bis(triethoxysilyl)benzene, 3-chloropropyltrimethoxysilane, 3-chloropropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-glycidoxypropyltrimethoxysilane, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, tetraacetoxysilane, tetrakis(trichloroacetoxy)silane, tetrakis(trifluoroacetoxy)silane, triacetoxysilane, tris(trichloroacetoxy)silane, tris(trifluoroacetoxy)silane, methyltriacetoxysilane, methyltris(trichloroacetoxy)silane, tetrachlorosilane, tetrabromosilane, tetrafluorosilane, trichlorosilane, tribromosilane, trifluorosilane, methyltrichlorosilane, methyltribromosilane, methyltrifluorosilane, tetrakis(methylethylketoxime)silane, tris(methylethylketoxime)silane, methyl tris(methylethylketoxime)silane, phenyl tris(methylethylketoxime)silane, bis(methylethylketoxime) silane, methyl bis(methylethylketoxime)silane, hexamethyldisilazane, hexamethylcyclotrisilazane, bis(dimethylamino)dimethylsilane, bis(diethyl amino)dimethyl silane, bis(dimethylamino)methyl silane, and bis(di ethyl amino)methyl silane.

Further, a hydrolyzable silicon-containing compound represented by the following formula (8) is referred to as component (e3). Specific examples of component (e3) include a partial hydrolytic condensate of tetramethoxysilane (trade name "M silicate 51" manufactured by Tama Chemicals Co., Ltd.; trade name "MSI51" manufactured by Colcoat Co., Ltd.; and trade names "MS51" and "MS56" manufactured by Mitsubishi Chemical Corporation), a partial hydrolytic condensate of tetraethoxysilane (trade names "Silicate 35" and "Silicate 45" manufactured by Tama Chemicals Co., Ltd.; and trade names "ESI40" and "ESI48" manufactured by Colcoat Co., Ltd.), and a co-partial hydrolytic condensate of tetramethoxysilane and tetraethoxysilane (trade name "FR-3" manufactured by Tama Chemicals Co., Ltd.; and trade name "EMSi48" manufactured by Colcoat Co., Ltd.).

$$R^3-(O-Si(OR^3)_2)_n-OR^3 \quad (8)$$

(In the formula (8), $R^3$ represents an alkyl group having 1 to 6 carbon atoms. n is an integer of 2 to 8.)

The hydrolyzable silicon compound (E) may be used singly or in combinations of two or more. A mass ratio of component (A) to component (E) in the coating composition is E/A=5/100 to 90/100 and more preferably E/A=5/100 to 70/100. When E/A is 5/100 or more, scratch resistance of a coating film to be formed can be made sufficient, and when the E/A is 90/100 or less, the strength of the coating film can be properly held, and good hard coat performance can be obtained.

Other Optional Components

The coating composition for forming the coating film according to the present invention may contain, in addition to components (A) and (B), optional components exemplified below (those except for component (C), (D), or (E)). In another embodiment, the coating composition may contain, in addition to components (A), (B), and (C), optional components exemplified below (those except for component (D) or (E)). In another embodiment, the coating composition may contain, in addition to components (A), (B), and (D), optional components exemplified below (those except for component (C) or (E)). In another embodiment, the coating composition may contain, in addition to components (A), (B), and (E), optional components exemplified below (those except for component (C) or (D)). In another embodiment, the coating composition may contain, in addition to components (A), (B), (C), and (D), optional components exemplified below (those except for component (E)). In another embodiment, the coating composition may contain, in addition to components (A), (B), (C), and (E), optional components exemplified below (those except for component (D)). In another embodiment, the coating composition may contain, in addition to components (A), (B), (D), and (E), optional components exemplified below (those except for component (C)). In another embodiment, the coating composition may contain, in addition to components (A), (B), (C), (D) and (E), optional components exemplified below.

In one embodiment, the coating composition for obtaining a coating film can contain additional components usually added to a coating material and a molding resin depending upon the application and the method to be employed and the like. Examples thereof include a light stabilizer, a UV absorbent, a thickening agent, a leveling agent, a thixotropy agent, a defoaming agent, a freezing stabilizer, a matting agent, a crosslinking reaction catalyst, a pigment, a curing catalyst, a crosslinking agent, a filler, an antiskinning agent, a dispersant, a wetting agent, an antioxidant, a UV absorbent, a rheology controlling agent, a film-forming auxiliary, a rust preventing agent, a dye, a plasticizer, a lubricant, a reducing agent, an antiseptic agent, an antifungal agent, a deodorant, a yellowing inhibitor, an antistatic agent, and a charge controller. They may be selected and used in combination depending upon the purpose.

Examples of a surfactant include anionic surfactants such as an alkylbenzene sulfonic acid, a sodium fatty acid, an alkyl sulfate, an alkyl polyoxyethylene sulfate, and an alkyl phosphate; cationic surfactants such as an alkyl trimethyl ammonium salt, a dialkyl dimethyl ammonium salt, an alkyl benzyl dimethyl ammonium salt, an alkyl pyridinium chloride, and a benzalkonium chloride; nonionic surfactants such as a polyoxyethylene-polyoxypropylene condensate, a polyoxyethylene alkyl ether, an alkyl polyglucoside, an alkyl monoglyceryl ether, a sorbitan fatty acid ester, a polyoxyethylene sorbitan fatty acid ester, lauric acid diethanolamide, oleic acid diethanolamide, stearic acid diethanolamide, a glycerin fatty acid ester, a sucrose fatty acid ester, and a polyoxyethylene alkylphenyl ether; and zwitterionic surfactants such as a lauryldialkylaminoacetic acid betaine, a stearyldialkylaminoacetic acid betaine, a dodecylaminomethyldialkylsulfopropyl betaine, a hexadecylaminomethyldialkylsulfopropyl betaine, an octadecylaminomethyl dialkylsulfopropyl betaine, cocamidopropyl betaine, cocamidopropyl hydroxysultaine, an alkyl-N-carboxymethyl-N-hydroxyethyl imidazolinium betaine, sodium lauroyl glutamate, potassium lauroyl glutamate, lauroyl methyl-$\beta$-alanine, lauryldimethylamine N-oxide, and oleyldimethylamine N-oxide. By using these in combination with the hydrophilic compound (B), the hydrophilicity, antifogging properties, and water resistance of the resulting coating film can be further improved. Among these surfactants, in particular, in the case of using a surfactant having a long chain alkyl group having 10 or more carbon atoms and/or a surfactant having a fluorine atom in the molecule, elution into water from inside of a coating film tends to be suppressed, so that it is more preferable from a viewpoint of water resistance.

Examples of the crosslinking reaction catalyst and/or the curing catalyst include dialkyltin dicarboxylates such as dibutyltin dilaurate, dioctyltin dilaurate, and dibutyltin diacetate; tin oxide compounds such as dibutyltin oxide; metal carboxylates such as tin 2-ethylhexanoate, zinc 2-ethylhexanoate, and cobalt salts; and tertiary amines such as triethylamine, pyridine, methylpyridine, benzyldimethylamine, N,N-dimethylcyclohexylamine, N-methylpiperidine, pentamethyldiethylenetri amine, N,N'-endoethylenepiperazine, and N,N'-dimethylpiperazine.

As the light stabilizer, for example, hindered amine based light stabilizers are preferably used. Of them, a radical polymerizable light stabilizer having a radical polymerizable double bond within the molecule is preferable. As the UV absorbent, for example, an organic UV absorbent can be used. As the organic UV absorbent, it is possible to use, for example, a benzophenone UV absorbent, a benzotriazole UV absorbent, and a triazine UV absorbent. Of them, a radical polymerizable UV absorbent having a radical polymerizable double bond within the molecule is preferably used. Furthermore, a benzotriazole UV absorbent and a triazine UV absorbent having a high UV ray absorption ability are preferable. The light stabilizer is preferably used in combination with an organic UV absorbent. Use of them in combination can improve the weather resistance of a coating film formed from the coating composition. A wide variety of additional components such as the organic UV absorbent and the light stabilizer may be simply blended with components (A) and (D) and may be co-existed in synthesizing component (D).

Those optional components can be usually used in a blending amount of 10 parts by mass or less, 5 parts by mass or less, or 3 parts by mass or less with respect to components (A) and (B) and optional component (C) and/or component (D) and/or component (E).

Substrate

The substrate is positioned as an object to which particularly excellent antifogging properties and excellent ability to retain antifogging properties can be imparted by a coating layer. Various materials can be adopted as the substrate. In one embodiment, the substrate is preferably formed of a resin. The substrate formed of a resin is not particularly limited, and examples thereof include organic substrates such as a synthetic resin and a natural resin.

As the synthetic resin, a thermoplastic resin and a curable resin (such as a thermosetting resin, a photocurable resin, and a moisture-curable resin) can be used. In more detail, examples thereof include a silicone resin, an acrylic resin, a methacrylic resin, a fluororesin, an alkyd resin, an aminoalkyd resin, a vinyl resin, a polyester resin, a styrene-butadiene resin, a polyolefin resin, a polystyrene resin, a polyketone resin, a polyamide resin, a polycarbonate resin, a polyacetal resin, a polyetheretherketone resin, a polyphenylene oxide resin, a polysulfone resin, a polyphenylene sulfone resin, a polyether resin, a polyvinyl chloride resin, a polyvinylidene chloride resin, a urea resin, a phenol resin, a melamine resin, an epoxy resin, a urethane resin, and a silicone-acrylic resin. However, the synthetic resin is not limited to these examples.

The natural resin is not particularly limited, and examples thereof include cellulose resins, isoprene resins such as natural rubber, and protein resins such as casein.

In one embodiment, although the surface of a resin plate may be subjected to a surface treatment such as a corona discharge treatment, a flame treatment, or a plasma treatment, these surface treatments are not indispensable.

The type and thickness of the substrate to be used and the thickness of a film formed by the surface treatment are not particularly limited, and can be set appropriately according to the application.

Production of Coating Composition

In a typical embodiment, the coating composition for forming the coating film according to the present invention can be produced by a method including a step of mixing components (A) and (B) in advance and then mixing them with water and a step of stirring the mixture at a temperature of less than 40° C. for 10 minutes or more. In general, when a coating composition containing water is produced, there are, for example, a method in which each of components contained in the coating composition is separately diluted with water and then they are mixed, a method of mixing each of components in water, and a method in which the respective components are mixed in advance and then diluted with water. In the present invention, it is preferable to mix components (A) and (B) in advance. By mixing them in advance, components (A) and (B) can firmly generate an interaction. A coating film obtained from the coating composition thus prepared is preferable because it is excellent in water resistance. By further stirring at a temperature of less than 40° C. for 10 minutes or more, a coating composition in which components (A) and (B) are uniformly dispersed can be formed. A coating film obtained from the coating composition thus prepared is preferable because it is excellent in transparency and appearance.

Production of Coating Film

The coating film according to an embodiment can be, for example, formed by applying a coating composition (sometimes abbreviated as "aqueous dispersion"), dispersed in a solvent such as water or the like, onto a substrate and drying the coating composition. Drying here can be carried out at room temperature (for example, about 0° C. to 45° C.) without external heating. The viscosity of the aqueous dispersion may be preferably 0.1 to 100,000 mPa·s at 20° C., more preferably 1 to 10,000 mPa·s (measured with a vibration type viscometer). As the coating method, it is possible to use, for example, a spraying method, a flow coating method, a roll coating method, a brush coating method, a dip coating method, a spin coating method, a screen printing method, a casting method, a gravure printing method, and a flexographic printing method. In the formation of a composite of a substrate and a coating film, for example, the coating film is dried on the substrate, and then, if desired, a heat treatment at preferably 20° C. to 500° C. and more preferably 40° C. to 250° C., an irradiation treatment with UV light, or the like may be performed.

In one embodiment, it is preferable that a dried coating film is heat treated at a temperature of 50° C. or more and less than 120° C. for 10 minutes to 60 minutes, from viewpoints of adhesion to a substrate, water resistance, and scratch resistance. The temperature for this heat treatment is more preferably 60° C. or more from viewpoints of the curing rate and adhesion of the coating film. The temperature for this heat treatment is preferably 100° C. or less, more preferably 80° C. or less, from viewpoints of productivity and applicable substrate type.

Desired characteristics of the surface of the coating film, formed in this manner, by XPS elemental analysis are as described above in relation to component (B).

The thickness of the coating film is preferably 0.05 to 100 μm, more preferably 0.1 to 10 μm. From a viewpoint of transparency, the thickness of the coating film is preferably 100 μm or less, and in order to exhibit functions such as weather resistance and antifouling properties, the thickness is preferably 0.05 μm or more. In one embodiment, the "coating film" is not necessarily required to be a continuous film, but may take forms such as a discontinuous film and an island-like dispersed film.

EXAMPLES

The present invention is described more specifically with reference to Examples and Comparative Examples below. The present invention is not limited by Examples below without deviating from the gist of the invention. The subject matter of the present invention can be defined only by the scope of the appended claims and includes modifications and equivalents which will be apparent to one skilled in the art, in addition to the literal scope.

Physical properties were evaluated by the following methods.

<Number Average Particle Size>

A sample was diluted by appropriately adding a solvent so as for the solid content to be 1 to 20% by mass, and subjected to measurement with a wet particle size analyzer (Microtrack UPA-9230, manufactured by Nikkiso Co., Ltd., Japan).

<Water Contact Angle>

A deionized water drop was placed on the coating film and allowed to stand still at 23° C. for one minute, and thereafter, the water contact angle was measured using a contact-angle measuring device (CA-X150 contact angle meter manufactured by Kyowa Interface Science Co., Ltd., Japan).

<Appearance of Coating Film>

The appearance of the resulting coating film was visually evaluated as follows.

⊚ (good): transparent.
○ (roughly good): partly clouded.
x (poor): entirely clouded.

<Adhesion Test (Cross-Cut Test)>

With respect to the resulting coating film, the adhesion was evaluated as follows in a cross-cut test of 1 mm square and 100 grids by a method in accordance with JIS-K 5600-5-6.

○ (good): no peeling.
Δ (medium): peeling is less than 50%.
x (poor): peeling is 50% or more.

<Antifogging Properties Test>

A test piece of the resulting coating film was placed at a height of 5 cm from the water surface of a hot water bath kept at 80° C. such that the coating film surface faced downward, steam from the hot water bath was continuously applied to the coating film, and presence or absence of fogging after 30 seconds from the application of steam was visually evaluated as follows. If the evaluation is Δ or more, there is no problem in practical use, and it is more preferable when the evaluation is ○.

○ (good): no fogging occurs at all.
Δ (medium): slight fogging occurs immediately after application of steam.
x (poor): fogging occurs.

<Scratch Resistance>

When the coating film surface was rubbed one time back and forth with a Kimwipe, the state of the coating film was observed with a digital microscope and evaluated as follows.

○ (good): no scratches or peeling.
Δ (medium): no peeling, but there are scratches.
x (poor): the coating film is peeled off.

<XPS Measurement>

The relative elemental concentration of the coating film surface was measured by XPS (ULVAC-PHI, Verasa probeII). The measurement was performed in a manner where an excitation source was mono.AlK• (15 kV×0.3 mA), the analysis size was about 200 mmϕ, and the photoelectron takeoff angle was 45°

The take-in area for the measurement was set as follows:
Survey scan: 0 to 1,100 eV, and
Narrow scan: C1s, O1s, Si2p, N1s.
The pass energy for the measurement was set as follows:
Survey scan: 188 eV, and
Narrow scan: 47 eV.

The elemental concentration ratio (C1 s/M) of C element and a metal element obtained from a C1s spectrum and a metal (M) spectrum derived from a metal oxide (silica) and the relative elemental concentration (atomic %) of C element derived from carbon-oxygen bonds and carbon-nitrogen bonds were determined.

In peak separation of C1s, the half value widths of components were set to be the same.

<Water Resistance Test>

The produced antifogging coating film was immersed in warm water at 40° C. for 240 hours and then allowed to stand in an environment of 23° C. and 50% RH for 24 hours. With respect to the resulting antifogging coating film, the appearance, adhesion, and antifogging properties were evaluated.

<Moisture Resistance Test>

The produced antifogging coating film was exposed to an environment of 85° C. and 85% RH for 24 hours and then allowed to stand in an environment of 23° C. and 50% RH for 1 hour. With respect to the resulting antifogging coating film, the appearance, adhesion, water contact angle, and antifogging properties were evaluated.

Synthesis Example 1 (Synthesis of Aqueous Dispersion of Polymer Particles (D))

In a reactor equipped with a reflux condenser, a dropping vessel, a thermometer, and a stirrer, 1600 g of ion-exchanged water and 4 g of dodecylbenzenesulfonic acid were charged, and then heated to 80° C. under stirring. To this mixture, a blend liquid of 185 g of dimethyldimethoxysilane and 117 g of phenyltrimethoxysilane was added dropwise over about 2 hours while keeping the temperature of the reactor at 80° C., and thereafter stirring was continued for about 1 hour while keeping the temperature of the reactor at 80° C. Subsequently, a blend liquid of 86 g of butyl acrylate, 133 g of phenyltrimethoxysilane, and 1.3 g of 3-methacryloxypropyltrimethoxysilane and a blend liquid of 137 g of N,N-diethylacrylamide, 3 g of acrylic acid, 13 g of a reactive emulsifier (trade name "ADEKA REASOAP SR-1025", manufactured by ADEKA Corporation, an aqueous solution containing 25 mass % solid content), 40 g of a 2 mass % ammonium persulfate aqueous solution, and 1900 g of ion-exchanged water were simultaneously added dropwise over about 2 hours while keeping the temperature of the reactor at 80° C. Further, under the condition that the temperature inside the reactor was 80° C., the reaction solution was continuously stirred for about 2 hours, then cooled to room temperature, filtered with a 100-mesh metallic gauze, then regulated with ion-exchanged water so as for the solid content to be 10.0% by mass, and thus an aqueous dispersion of polymer particles (D) having a number average particle size of 85 nm was obtained.

Synthesis Example 2 (Synthesis of Hydrophilic Compound (B)-1)

To a reactor equipped with a reflux condenser, a dropping vessel, a nitrogen introducing pipe, a thermometer, and a stirrer, 360 g of isopropanol, 60.0 g of N,N-diethylacrylamide, 38.7 g of butyl acrylate, and 1.3 g of 2-hydroxyethyl methacrylate were each charged, and then heated to 80° C. under a nitrogen gas flow. A solution prepared by dissolving 2.4 g of V-70 (manufactured by Wako Pure Chemical Industries, Ltd.) as an initiator in 40 g of isopropanol was added dropwise over about 2 hours while keeping the temperature of the reactor at 80° C. Further, under the condition that the temperature inside the reactor was 80° C., the reaction solution was continuously stirred for about 2 hours, and then cooled to room temperature, and isopropanol was removed under reduced pressure to obtain a hydrophilic compound (B)-1. Table 1 shows the types and blending amounts (g) of the raw materials in this synthesis example, and the molecular weight, the density, and the HLB (measured by the Griffin method) of the product. The molecular weight here is an average molecular weight based on the weight (mass) in terms of polystyrene measured by GPC (according to JIS K 7252-1).

Synthesis Examples 3 to 5 (Synthesis of Hydrophilic Compounds (B)-2, (B)-3, and (B)-4)

In Synthesis Examples 3 to 5, hydrophilic compounds (B)-2, (B)-3, and (B)-4 were produced by the method according to Synthesis Example 2, except that the types and blending amounts of raw materials were changed as shown in Table 1. In addition to the types and blending amounts of the raw materials used in Synthesis Examples 3 to 5, Table 1 show the molecular weight, density and HLB (measured by the Griffin method) of each of the resulting hydrophilic compounds.

TABLE 1

| | Synthesis Ex. 2 (B)-1 | Synthesis Ex. 3 (B)-2 | Synthesis Ex. 4 (B)-3 | Synthesis Ex. 5 (B)-4 |
|---|---|---|---|---|
| DEAAm | 60 | 60 | 60 | |
| SPDMAM | | | | 60 |
| BA | 38.7 | 35 | 36 | 35 |
| 2-HEMA | 1.3 | | | |
| PEGM | | 5 | | 5 |
| AA | | | 4 | |
| V-70 | 2.4 | 2.3 | 2.5 | 1.5 |
| Molecular weight (g/mol) | 9800 | 7700 | 7500 | 8200 |
| Density (g/cm$^3$) | 0.92 | 0.93 | 0.92 | 1.00 |
| HLB | 9.9 | 9.4 | 9.5 | 11.3 |

The abbreviations for the names of the respective compounds in the above table are as follows.
DEAAm: N, N-diethylacrylamide
SPDMAM: 2-(N-3-sulfopropyl-N,N-dimethylammonium)ethyl methacrylate
BA: butyl acrylate
2-HEMA: 2-hydroxyethyl methacrylate
PEGM: poly(ethylene glycol) methacrylate
AA: acrylic acid Example 1

40.0 g of water-dispersed colloidal silica (trade name "Snowtex-OXS", manufactured by Nissan Chemical Industries, Ltd., solid content 10% by mass) having a number average particle size of 4 nm as the metal oxide (A) and 4.0 g of a polyoxyethylene-oxypropylene-oxyethylene triblock copolymer (trade name "P123", manufactured by Sigma-Aldrich Japan, solid content 100% by mass, density 1.1 g/cm³, average particle size 2.1 nm) as the hydrophilic compound (B) were mixed, and then the mixture was stirred at 25° C. for 1 hour. Subsequently, 17.3 g of distilled water was mixed and then stirred at 25° C. for 1 hour to obtain a coating composition having a solid content of 15%. A polycarbonate plate (available from Takiron Co., Ltd.) having a length of 60 mm, a width of 60 mm, and a thickness of 2 mm was coated with the resulting coating composition under a condition of 800 rpm×5 sec by a spin coater and dried at 20° C. for 30 minutes. Thereafter, a test plate was obtained by drying at 80° C. for 30 minutes. The film thickness of the resulting coating film was 300 nm. The coating film had good appearance (in other words, the coating film was transparent). In addition, the water contact angle was 10°, and high hydrophilicity was exhibited. The elemental concentration ratio (C1s/Si) between carbon (C) element and silicon (Si) element obtained from the C1s spectrum and the Si spectrum derived from silica in the elemental analysis of the surface using XPS was 0.8, and the relative elemental concentration of C element obtained from the C1s spectrum derived from carbon-oxygen bonds and carbon-nitrogen bonds was 13 atomic %. For a water resistance test, the test piece thus obtained was immersed in warm water at a temperature of 40° C. for 240 hours, then taken out from the warm water, and allowed to stand in an environment of 23° C. and 50% RH for 24 hours. Thereafter, as a result of evaluating the appearance, adhesion, and antifogging properties of the coating film, the appearance of the coating film was good, the antifogging properties were maintained, and the water resistance was generally good. For a moisture resistance test, the test piece thus obtained was put into an environmental tester set to a temperature of 85° C. and 85% RH for 24 hours, and then allowed to stand in an environment of a temperature of 23° C. and 50% RH for 1 hour. Thereafter, as a result of evaluating the appearance, adhesion, water contact angle, and antifogging properties of the coating film, the appearance of the coating film was good, the hydrophilicity (water contact angle) and antifogging properties were maintained, and the moisture resistance was moderately good. Table 2 shows the blending amount (parts by mass) of each raw material. Evaluation results including initial characteristics are each shown in Table 3.

Examples 2 to 10, 12 and 13 and Comparative Examples 1 to 5

In Examples 2 to 10, 12, and 13, and Comparative Examples 1 to 5, coating films were produced by the method according to Example 1, except that the types and blending amounts (parts by mass) of raw materials were changed as shown in Tables 2 and 4. A coating film test piece was produced, and the performance of the coating film was evaluated. Evaluation results of the coating film performance including initial characteristics are each shown in Tables 3 and 5.

Example 11

40.0 g of water-dispersed colloidal silica (trade name "Snowtex-O", manufactured by Nissan Chemical Industries, Ltd., solid content 20% by mass) having a number average particle size of 15 nm as the metal oxide (A), 4.0 g of a polyoxyethylene-oxypropylene-oxyethylene triblock copolymer (trade name "P123", manufactured by Sigma-Aldrich Japan, solid content 100% by mass, density 1.1 g/cm³, average particle size 2.1 nm) as the hydrophilic compound (B), and 3.2 g of polyisocyanate B were mixed, and then the mixture was stirred at 25° C. for 1 hour. Subsequently, 17.3 g of distilled water was mixed and then stirred at 25° C. for 1 hour to obtain a coating composition having a solid content of 15%. A polycarbonate plate (available from Takiron Co., Ltd.) having a length of 60 mm, a width of 60 mm, and a thickness of 2 mm was coated with the resulting coating composition under a condition of 800 rpm×5 sec by a spin coater and dried at 20° C. for 30 minutes. Thereafter, a test plate was obtained by drying at 120° C. for 30 minutes. The film thickness of the resulting coating film was 300 nm. The coating film had a good appearance (in other words, the coating film was transparent). In addition, the water contact angle was 15°, and high hydrophilicity was exhibited. The elemental concentration ratio (C1s/Si) between carbon (C) element and silicon (Si) element obtained from the C1s spectrum and the Si spectrum derived from silica in the elemental analysis of the surface using XPS was 3.0, and the relative elemental concentration of C element obtained from the C1s spectrum derived from carbon-oxygen bonds and carbon-nitrogen bonds was 28 atomic %. For a water resistance test, the test piece thus obtained was immersed in warm water at a temperature of 40° C. for 240 hours, then taken out from the warm water, and allowed to stand in an environment of 23° C. and 50% RH for 24 hours. Thereafter, as a result of evaluating the appearance, adhesion, and antifogging properties of the coating film, the appearance of the coating film was good, the antifogging properties were maintained, and the water resistance was moderately good. For a moisture resistance test, the test piece thus obtained was put into an environmental tester set to a temperature of 85° C. and 85% RH for 24 hours, and then allowed to stand in an environment of a temperature of 23° C. and 50% RH for 1 hour. Thereafter, as a result of evaluating the appearance, adhesion, water contact angle, and antifogging properties of the coating film, the appearance of the coating film was good, the hydrophilicity (water contact angle) and antifogging properties were maintained, and the moisture resistance was moderately good. Table 2 shows the blending amount (parts by mass) of each raw material. Each evaluation results including initial characteristics are each shown in Table 3.

Comparative Example 6

40.0 g of water-dispersed colloidal silica (trade name "Snowtex-OXS", manufactured by Nissan Chemical Industries, Ltd., solid content 10% by mass) having a number average particle size of 4 nm as the metal oxide (A) and 4.0 g of a polyoxyethylene-oxypropylene-oxyethylene triblock copolymer (trade name "P123", manufactured by Sigma-Aldrich Japan, solid content 100% by mass, density 1.1 g/cm³, average particle size 2.1 nm) as the hydrophilic compound (B) were mixed, and then the mixture was stirred at 25° C. for 1 hour. Subsequently, 17.3 g of distilled water was mixed and then stirred at 50° C. for 10 minutes. The coating composition after stirring remarkably thickened, and film formation was impossible. Table 4 shows the blending amount (parts by mass) of each raw material of the coating composition (raw material of the coating film) of Comparative Example 6.

Comparative Example 7

40.0 g of water-dispersed colloidal silica (trade name "Snowtex-OXS", manufactured by Nissan Chemical Industries, Ltd., solid content 10% by mass) having a number average particle size of 4 nm as the metal oxide (A) and 4.0 g of a polyoxyethylene-oxypropylene-oxyethylene triblock copolymer (trade name "P123", manufactured by Sigma-Aldrich Japan, solid content 100% by mass, density 1.1 g/cm$^3$, average particle size 2.1 nm) as the hydrophilic compound (B) were mixed, and then the mixture was stirred at 25° C. for 1 hour. 17.3 g of distilled water and 0.04 g of a 20% ammonia aqueous solution were mixed to control the pH to 8.0, followed by stirring at 25° C. for 2 hours to obtain a coating composition having a solid content of 15%. A polycarbonate plate (available from Takiron Co., Ltd.) having a length of 60 mm, a width of 60 mm, and a thickness of 2 mm was coated with the resulting coating composition under a condition of 800 rpm×5 sec by a spin coater and dried at 20° C. for 30 minutes. Thereafter, a test plate was obtained by drying at 80° C. for 30 minutes. The film thickness of the resulting coating film was 300 nm. The coating film had good appearance (in other words, the coating film was transparent). In addition, the water contact angle was 10°, and high hydrophilicity was exhibited. The elemental concentration ratio (C1s/Si) between carbon (C) element and silicon (Si) element obtained from the C1s spectrum and the Si spectrum derived from silica in the elemental analysis of the surface using XPS was 11, and the relative elemental concentration of C element obtained from the C1s spectrum derived from carbon-oxygen bonds and carbon-nitrogen bonds was 51 atomic %. For a water resistance test, when the test piece thus obtained was immersed in warm water at a temperature of 40° C. for 240 hours and then taken out from the warm water, elution of the coating film was confirmed. For a moisture resistance test, the test piece thus obtained was put into an environmental tester set to a temperature of 85° C. and 85% RH for 24 hours, and then allowed to stand in an environment of a temperature of 23° C. and 50% RH for 1 hour. Thereafter, as a result of evaluating the appearance, adhesion, water contact angle, and antifogging properties of the coating film, it was found that over half portion was peeled, and the adhesion remarkably deteriorated. Table 4 shows the blending amount (parts by mass) of each raw material of the coating film of Comparative Example 7, and Table 5 shows evaluation results of the coating film performance including initial characteristics.

Comparative Example 8

40.0 g of water-dispersed colloidal silica (trade name "Snowtex-OXS", manufactured by Nissan Chemical Industries, Ltd., solid content 10% by mass) having a number average particle size of 4 nm as the metal oxide (A) and 4.0 g of a polyoxyethylene-oxypropylene-oxyethylene triblock copolymer (trade name "P123", manufactured by Sigma-Aldrich Japan, solid content 100% by mass, density 1.1 g/cm$^3$, average particle size 2.1 nm) as the hydrophilic compound (B) were mixed, and then the mixture was stirred at 25° C. for 1 hour. Subsequently, 356.0 g of distilled water was mixed and then stirred at 25° C. for 1 hour. The coating composition (distilled water concentration 98%; solid content concentration 2% by mass) after stirring had low film-forming property, and film formation on a substrate was impossible. Table 4 shows the blending amount (parts by mass) of each raw material of the coating composition (raw material of the coating film) of Comparative Example 8.

Comparative Example 9

40.0 g of water-dispersed colloidal silica (trade name "Snowtex-OXS", manufactured by Nissan Chemical Industries, Ltd., solid content 10% by mass) having a number average particle size of 4 nm as the metal oxide (A), 4.0 g of a polyoxyethylene-oxypropylene-oxyethylene triblock copolymer (trade name "P123", manufactured by Sigma-Aldrich Japan, solid content 100% by mass, density 1.1 g/cm$^3$, average particle size 2.1 nm) as the hydrophilic compound (B), and 17.3 g of distilled water were mixed, and then the mixture was stirred at 25° C. for 2 hours to obtain a coating composition having a solid content of 15%. In this comparative example, unlike the other examples, distilled water was collectively mixed together with components (A) and (B). A polycarbonate plate (available from Takiron Co., Ltd.) having a length of 60 mm, a width of 60 mm, and a thickness of 2 mm was coated with the resulting coating composition under a condition of 800 rpm×5 sec by a spin coater and dried at 20° C. for 30 minutes. Thereafter, a test plate was obtained by drying at 80° C. for 30 minutes. The film thickness of the resulting coating film was 300 nm. The coating film had a good appearance (in other words, the coating film was transparent). The water contact angle was 28°. The elemental concentration ratio (C1s/Si) between carbon (C) element and silicon (Si) element obtained from the C1s spectrum and the Si spectrum derived from silica in the elemental analysis of the surface using XPS was 11, and the relative elemental concentration of C element obtained from the C1s spectrum derived from carbon-oxygen bonds and carbon-nitrogen bonds was 51 atomic %. For a water resistance test, when the test piece thus obtained was immersed in warm water at a temperature of 40° C. for 240 hours and then taken out from the warm water, elution of the coating film was confirmed. For a moisture resistance test, the test piece thus obtained was put into an environmental tester set to a temperature of 85° C. and 85% RH for 24 hours, and then allowed to stand in an environment of a temperature of 23° C. and 50% RH for 1 hour. Thereafter, as a result of evaluating the appearance, adhesion, water contact angle, and antifogging properties of the coating film, it was found that over half portion was peeled, and the adhesion remarkably deteriorated. Table 4 shows the blending amount (parts by mass) of each raw material of the coating film of Comparative Example 9, and Table 5 shows evaluation results of the coating film performance including initial characteristics.

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| Base agent | Polymer particles (D) | Synthesis example 1 | | | | | | | | | | | | 50 | 100 |
| | Metal oxide (A) | STOXS[1] | 100 | | | | 100 | 100 | 100 | 100 | | | | | |
| | | STO[2] | | 100 | | 100 | | | | | | 100 | 100 | 100 | 300 |
| | | STOL[3] | | | 100 | 100 | | | | | | | | | |

TABLE 2-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Hydrophilic compound (B) | P123[4] | 100 | 30 | 10 |  | 12 |  |  |  |  | 50 | 50 | 30 | 100 |
|  | PE10100[5] |  |  |  | 10 |  |  |  |  |  |  |  |  |  |
|  | (B)-1 |  |  |  |  |  | 100 |  |  |  |  |  |  |  |
|  | (B)-2 |  |  |  |  |  |  | 100 |  |  |  |  |  |  |
|  | (B)-3 |  |  |  |  |  |  |  | 100 |  |  |  |  |  |
|  | (B)-4 |  |  |  |  |  |  |  |  | 100 |  |  |  |  |
|  | HLB | 6 | 6 | 6 | 3 | 6 | 10 | 9 | 10 | 11 | 6 | 6 | 6 | 6 |
|  | Coverage (P) | 70% | 75% | 80% | 97% | 30% | 65% | 70% | 71% | 65% | 125% | 125% | 75% | 83% |
| Curing agent (C) | Polyisocyanate A[6] |  |  |  |  |  |  |  |  |  | 20 |  |  | 40 |
|  | Polyisocyanate B[7] |  |  |  |  |  |  |  |  |  |  | 40 |  |  |

Each reference number noted in Table 2 means the following.

1) STOXS: Snowtex-OXS manufactured by Nissan Chemical Industries, Ltd., solid content 10% by mass, acid type, average particle size 4 nm
2) STO: Snowtex-O, manufactured by Nissan Chemical Industries, Ltd., solid content 20%, acid type, average particle size 15 nm
3) STOL: Snowtex-OL manufactured by Nissan Chemical Industries, Ltd., solid content 20% by mass, acid type, average particle size 40 to 45 nm
4) P 123: manufactured by Sigma-Aldrich Japan, solid content 100% by mass
5) PE 10100: Pluronic PE 10100, manufactured by BASF, solid content 100% by mass
6) Polyisocyanate A: WT 30-100, manufactured by Asahi Kasei Corporation, solid content 100% by mass
7) Polyisocyanate B: WM44-L70G manufactured by Asahi Kasei Corporation

TABLE 3

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Initial properties | C1s/M | 0.8 | 0.75 | 0.85 | 1 | 0.3 | 0.9 | 1.1 | 1.5 | 0.8 | 3 | 3 | 1.1 | 2.5 |
|  | C—O, C—N atomic % | 13 | 14 | 15 | 10 | 7 | 9 | 12 | 11 | 9 | 27 | 28 | 12 | 30 |
|  | Appearance | ◎ | ◎ | ◎ | ◎ | ◎ | ◎ | ◎ | ◎ | ◎ | ◎ | ◎ | ◎ | ◎ |
|  | Adhesion | ○ | ○ | ○ | ○ | ○ | ○ | ○ | ○ | ○ | ○ | ○ | ○ | ○ |
|  | Water contact angle (°) | 10 | 5 | 5 | 6 | 10 | 30 | 12 | 6 | 2 | 16 | 15 | 13 | 10 |
|  | Scratch resistance | Δ | Δ | Δ | Δ | Δ | Δ | Δ | Δ | Δ | ○ | ○ | Δ | ○ |
|  | Antifogging properties | ○ | ○ | ○ | ○ | Δ | ○ | ○ | ○ | ○ | ○ | ○ | ○ | ○ |
| After water resistance test | Appearance | ◎ | ◎ | ◎ | ◎ | ◎ | ◎ | ◎ | ◎ | ◎ | ◎ | ◎ | ◎ | ◎ |
|  | Adhesion | Δ | Δ | Δ | Δ | Δ | Δ | Δ | Δ | Δ | ○ | ○ | ○ | ○ |
|  | Antifogging properties | ○ | ○ | ○ | ○ | Δ | ○ | ○ | ○ | ○ | ○ | ○ | ○ | ○ |
| After moisture resistance test | Appearance | ◎ | ◎ | ◎ | ◎ | ◎ | ◎ | ◎ | ◎ | ◎ | ◎ | ◎ | ◎ | ◎ |
|  | Adhesion | Δ | Δ | Δ | Δ | Δ | Δ | Δ | Δ | Δ | ○ | ○ | Δ | ○ |
|  | Water contact angle (°) | 18 | 20 | 12 | 17 | 30 | 35 | 20 | 8 | 3 | 20 | 18 | 13 | 22 |
|  | Antifogging properties | ○ | ○ | ○ | ○ | Δ | Δ | ○ | ○ | ○ | ○ | ○ | ○ | ○ |

TABLE 4

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Base agent | Polymer particles (D) | Synthesis example 1 |  |  |  |  |  |  |  |  |  |
|  | Metal oxide (A) | STOXS | 100 |  |  | 100 |  | 100 | 100 | 100 | 100 |
|  |  | STO |  |  | 100 | 100 |  |  |  |  |  |
|  | Hydrophilic compound (B) | P123 |  | 100 |  | 1000 |  | 100 | 100 | 100 | 100 |
|  |  | L44[8] |  |  |  | 1 |  |  |  |  |  |
|  |  | PEG4000[9] |  |  |  |  | 100 |  |  |  |  |
|  |  | HLB | — | 6 | 8 | 6 | 20 | 6 | 6 | 6 | 6 |
|  |  | Coverage (P) | — | — | 3% | 2500% | 77% | 70% | 70% | 70% | 70% |

Each reference number noted in Table 4 means the following. STOXS, STO, and P123 referred to in the table are as described above for Table 2.

8) L44: Pluronic L-44, manufactured by ADEKA Corporation, solid content 100%

9) PEG 4000: Polyethylene glycol 4,000, manufactured by Tokyo Chemical Industry Co., Ltd., solid content 100%

TABLE 5

| | | Comparative Example No. | | | | | | | | |
|---|---|---|---|---|---|---|---|---|---|---|
| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
| Initial properties | C1s/M | 0 | — | 0.1 | 14 | 0.15 | — | 11 | — | 11 |
| | C—O, C—N (atomic %) | 0 | 56 | 1 | 51 | 3 | — | 51 | — | 51 |
| | Appearance | — | ○ | X | ◎ | ◎ | — | ○ | — | ○ |
| | Adhesion | — | ○ | Δ | ○ | X | — | Δ | — | Δ |
| | Water contact angle (°) | — | 24 | 2 | 25 | 25 | — | 10 | — | 28 |
| | Scratch resistance | — | X | Δ | X | X | — | X | — | X |
| | Antifogging properties | — | ○ | ○ | ○ | ○ | — | ○ | — | ○ |
| After water resistance test | Appearance | — | Film elution | X | Film elution | Film elution | — | Film elution | — | Film elution |
| | Adhesion | — | Film elution | X | Film elution | Film elution | — | Film elution | — | Film elution |
| | Antifogging properties | — | Film elution | X | Film elution | Film elution | — | Film elution | — | Film elution |
| After moisture resistance test | Appearance | — | ◎ | X | ◎ | ◎ | — | ◎ | — | ◎ |
| | Adhesion | — | X | X | X | X | — | X | — | X |
| | Water contact angle (°) | — | 28 | 85 | 30 | 88 | — | 31 | — | 29 |
| | Antifogging properties | — | ○ | X | ○ | X | — | ○ | — | ○ |

For Comparative Examples 1, 6, and 8, film formation on a substrate was difficult, so that evaluation of physical properties of these coating films was not carried out.

<Evaluation Results>

As is apparent from Tables 3 and 5, Examples 1 to 13, which are the coating films of the present invention, had excellent coating film performance in all of the coating film appearance, hydrophilicity, antifogging properties, water resistance, and moisture resistance. In particular, in Examples 10 and 11 in which the isocyanate compound (C) as a curing agent was added, the adhesion of the coating film to the substrate after the water resistance test and the moisture resistance test was further improved. In Examples 12 and 13 in which the polymer particles (D) were added, the adhesion of the coating film to the substrate after the water resistance test was further improved. On the other hand, when a coating composition consisting only of colloidal silica in Comparative Example 1 was used, the wettability to the substrate and film-forming property were poor, and no coating film was obtained. When a coating composition consisting only of a hydrophilic compound in Comparative Example 2 was used, the formed coating film was not immobilized on colloidal silica or the like, so that the water resistance was very poor. When a coating composition having an insufficient amount of hydrophilic compound with respect to colloidal silica as in Comparative Example 3 was used, (C1s/Si value of the resulting coating film was less than 0.2, and) the dispersion stability of the coating composition was poor, so that the appearance of the resulting coating film was very poor. Since colloidal silica was exposed on the coating film surface, the antifogging properties after the moisture resistance test were very poor. When a coating composition in which the amount of a hydrophilic compound with respect to colloidal silica was too large as in Comparative Example 4 was used, (C1s/Si value of the resulting coating film exceeded 10, and) the water resistance of the coating film was very poor. In the coating film produced using PEG 4000 of Comparative Example 5 as a hydrophilic compound, the interaction between colloidal silica and the hydrophilic compound was weak, and the hydrophilic compound was not immobilized on the surface of the colloidal silica (as a result, the C1s/Si value was less than 0.2); therefore, both the water resistance and the moisture resistance were very poor. The coating film prepared by controlling the pH of the coating composition of Comparative Example 7 to be 8 had a C1s/Si value of more than 10, and the water resistance was very poor. When the coating composition was heated and stirred beforehand at 50° C. as in Comparative Example 6, remarkable thickening and aggregation of this composition occurred, and film formation was impossible. When the solid content in the coating composition was 2% by mass as in Comparative Example 8, the wettability to the substrate was poor, and film formation was impossible. When the raw materials of the composition were mixed all at once as in Comparative Example 9, the water resistance was lowered.

INDUSTRIAL APPLICABILITY

The coating film of the present invention is excellent in coating film appearance, hydrophilicity, antifogging properties, and water resistance, and can maintain the antifogging properties for a long period even under harsh environments such as high temperature and high humidity. Accordingly, the coating film of the present invention can be particularly suitably used as an antifogging coating film requiring high antifogging properties. Further, the coating film of the present invention can be used for applications requiring antifogging durability under a high humidity environment, serving as a coating film for automotive exterior parts such as a vehicle light such as a vehicle headlamp. Furthermore, the coating film of the present invention can be used for parts such as internal parts of various equipment and parts installed at high places, which cannot be easily taken out for removal of fogging. All of the above-described features and advantages of the coating film of the present invention are also applied to these antifogging coating films, coating films for automotive exterior parts, and coating films for internal parts.

The invention claimed is:

1. A coating film comprising:
   a metal oxide (A);
   a hydrophilic compound (B); and
   an isocyanate compound (C), wherein an elemental concentration ratio (C1s/M), which is between carbon (C) element and a metal element and which is obtained from a metal (M) spectrum derived from the metal oxide and a C1s spectrum in an elemental analysis of a surface of the coating film using XPS, is within the range of 0.75 to 10, and
   the metal oxide (A) is colloidal silica.

2. The coating film according to claim 1, wherein a relative elemental concentration of carbon (C) element obtained from the C1 s spectrum derived from carbon-oxygen bonds and/or carbon-nitrogen bonds in the elemental analysis of the surface of the coating film using XPS is within the range of 5 to 50 atomic %.

3. The coating film according to claim 1, wherein the hydrophilic compound (B) is bonded to the surface of the metal oxide via a non-covalent bond and/or a covalent bond.

4. The coating film according to claim 1, wherein the hydrophilic compound (B) is at least one selected from the group consisting of a nonionic compound, an anionic compound, and a zwitterionic compound.

5. The coating film according to claim 1, wherein the hydrophilic compound (B) has a carbon-oxygen bond in the molecule.

6. The coating film according to claim 1, wherein the hydrophilic compound (B) has an alkylene glycol moiety in the molecule.

7. The coating film according to claim 1, wherein the isocyanate compound (C) is a water-dispersible polyisocyanate compound.

8. The coating film according to claim 1, wherein the isocyanate compound (C) is a blocked polyisocyanate.

9. The coating film according to claim 1, further comprising polymer particles (D).

10. The coating film according to claim 1, wherein when the coating film is exposed to an environment of 85° C. and 85% RH for 24 hours and then subjected to a moisture resistance test in which the coating film is allowed to stand in an environment of 23° C. and 50% RH for 1 hour, the coating film has a water contact angle of less than 40° determined.

11. The coating film according to claim 1, which is used as an antifogging coating film.

12. The coating film according to claim 1, which is used as a coating film for automotive exterior parts.

13. A coating composition for producing the coating film according to claim 1, the coating composition comprising a metal oxide (A), a hydrophilic compound (B), and an isocyanate compound (C), wherein the metal oxide (A) is colloidal silica.

14. The coating composition according to claim 13, wherein the hydrophilic compound (B) has two or more functional groups capable of reacting with an isocyanate group in a molecule of the hydrophilic compound (B).

15. The coating composition according to claim 13 or 14, wherein an HLB value of the hydrophilic compound (B) determined by a Griffin method is 2 to 14.

16. The coating composition according to claim 13, further comprising at least one component selected from the group consisting of polymer particles (D) and water.

17. A laminate comprising a resin substrate and/or a glass substrate and the coating film according to claim 1.

* * * * *